United States Patent
Iwai

(10) Patent No.: US 10,304,015 B2
(45) Date of Patent: May 28, 2019

(54) FACILITY MANAGEMENT SUPPORT APPARATUS, FACILITY MANAGEMENT SUPPORT SYSTEM, AND FACILITY MANAGEMENT SUPPORT METHOD

(71) Applicant: PANASONIC INTELLECTUAL PROPERTY MANAGEMENT CO., LTD., Osaka (JP)

(72) Inventor: Kazuhiko Iwai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 790 days.

(21) Appl. No.: 14/793,017

(22) Filed: Jul. 7, 2015

(65) Prior Publication Data

US 2016/0012379 A1 Jan. 14, 2016

(30) Foreign Application Priority Data

Jul. 8, 2014 (JP) .................................. 2014-140267

(51) Int. Cl.
G06Q 10/00 (2012.01)
G06Q 10/06 (2012.01)
G06Q 30/06 (2012.01)

(52) U.S. Cl.
CPC . G06Q 10/063114 (2013.01); G06Q 30/0601 (2013.01)

(58) Field of Classification Search
CPC .................... G06Q 10/063114; G06Q 30/0601
USPC ................................................ 705/7.29, 7.31
See application file for complete search history.

(56) References Cited

U.S. PATENT DOCUMENTS

| 2006/0004582 A1* | 1/2006 | Claudatos | .......... G08B 13/1672 704/275 |
| 2008/0059274 A1* | 3/2008 | Holliday | .......... G06Q 10/06315 705/7.31 |
| 2011/0194843 A1 | 8/2011 | Harada | |

(Continued)

FOREIGN PATENT DOCUMENTS

| JP | 2001-331875 A | 11/2001 |
| JP | 2006-186895 A | 7/2006 |

(Continued)

OTHER PUBLICATIONS

Toshiba TEC Corporation, "A sales floor management system, a sales floor view", with english language translation, https://www.toshibatec.co.jp/products/retail/catalog/detail/uribaview/ (Attached).*

(Continued)

Primary Examiner — Rokib Masud
(74) Attorney, Agent, or Firm — Greenblum & Bernstein, P.L.C.

(57) ABSTRACT

The number of entering customers and number of paying customers in a store are obtained, statistical information indicating temporal change in status of the number of entering customers and the number of paying customers in a store is generated, the statistical information is displayed along a time axis, the number of a timeslot which is a selection point is displayed on the time axis, and the video of the inside of the store corresponding to the selected timeslot is displayed in response to the user's operation to select the timeslot.

9 Claims, 25 Drawing Sheets

(56) References Cited

U.S. PATENT DOCUMENTS

2013/0262179 A1* 10/2013 Harada .............. G06Q 30/0201
                                                    705/7.29
2015/0127485 A1   5/2015 Kakizawa et al.
2015/0222861 A1   8/2015 Fujii et al.

FOREIGN PATENT DOCUMENTS

| JP | 2007-179302 A | 7/2007 |
| JP | 2010-204999 A | 9/2010 |
| JP | 5072985 B2    | 11/2012 |
| JP | 2013-210953 A | 10/2013 |

OTHER PUBLICATIONS

Toshiba TEC Corporation, "a sales floor management system, a sales floor view", with english language translation, https://www.toshibatec.co.jp/products/retail/catalog/detail/uribaview/, 2 pages.

* cited by examiner

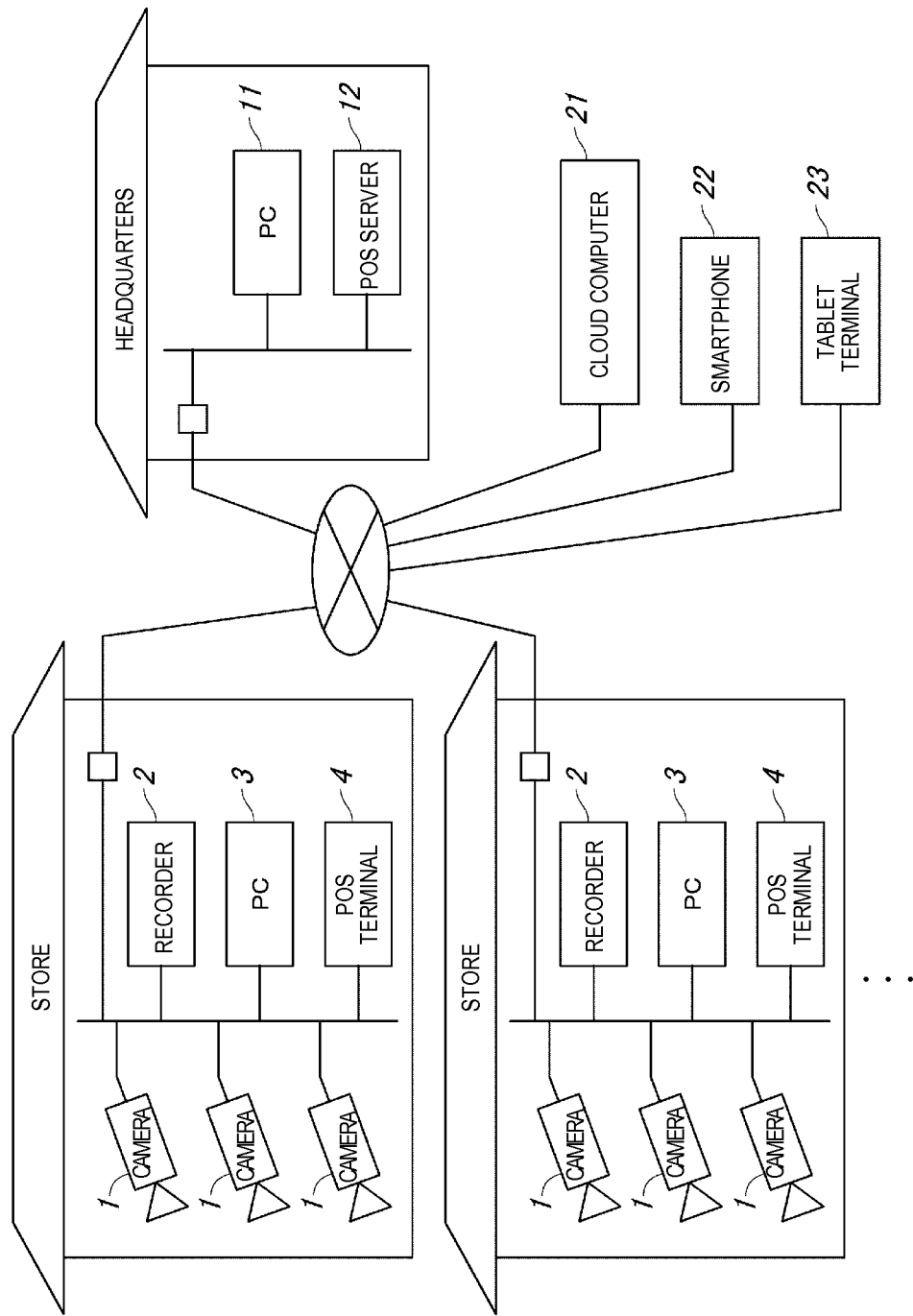

FIG. 9A

| TIMING | STORE GAP THRESHOLD VALUE | TASK CHECK | |
|---|---|---|---|
| 0 | 5 | UNNECESSARY | NECESSARY |
| 1 | 5 | UNNECESSARY | NECESSARY |
| 2 | 5 | UNNECESSARY | NECESSARY |
| 3 | 5 | UNNECESSARY | NECESSARY |
| 4 | 5 | UNNECESSARY | NECESSARY |
| 5 | 5 | UNNECESSARY | NECESSARY |
| 6 | 5 | UNNECESSARY | NECESSARY |
| 7 | 5 | UNNECESSARY | NECESSARY |
| 8 | 5 | UNNECESSARY | NECESSARY |
| 9 | 5 | UNNECESSARY | NECESSARY |
| 10 | 10 | UNNECESSARY | NECESSARY |
| 11 | 10 | UNNECESSARY | NECESSARY |
| 12 | 15 | UNNECESSARY | NECESSARY |
| 13 | 15 | UNNECESSARY | NECESSARY |

Date: 2014/05/14

[SETTING]

FIG. 9B

| TIMING | SALES FLOOR GAP THRESHOLD VALUE | TASK CHECK | |
|---|---|---|---|
| 0 | 5 | UNNECESSARY | NECESSARY |
| 1 | 5 | UNNECESSARY | NECESSARY |
| 2 | 5 | UNNECESSARY | NECESSARY |
| 3 | 5 | UNNECESSARY | NECESSARY |
| 4 | 5 | UNNECESSARY | NECESSARY |
| 5 | 5 | UNNECESSARY | NECESSARY |
| 6 | 5 | UNNECESSARY | NECESSARY |
| 7 | 5 | UNNECESSARY | NECESSARY |
| 8 | 5 | UNNECESSARY | NECESSARY |
| 9 | 5 | UNNECESSARY | NECESSARY |
| 10 | 10 | UNNECESSARY | NECESSARY |
| 11 | 10 | UNNECESSARY | NECESSARY |
| 12 | 15 | UNNECESSARY | NECESSARY |
| 13 | 15 | UNNECESSARY | NECESSARY |

Date: 2014/05/14
COOKED RICE ▼

[SETTING]

FIG. 19

| | SALES FLOOR A | SALES FLOOR B | SALES FLOOR C | SALES FLOOR D |
|---|---|---|---|---|
| 1:00 | (VIDEO) | (VIDEO) | (VIDEO) | (VIDEO) |
| 1:15 | (VIDEO) | (VIDEO) | (VIDEO) | (VIDEO) |
| 1:30 | (VIDEO) | (VIDEO) | (VIDEO) | (VIDEO) |
| 1:45 | (VIDEO) | (VIDEO) | (VIDEO) | (VIDEO) |

121

FACILITY MANAGEMENT SUPPORT APPARATUS, FACILITY MANAGEMENT SUPPORT SYSTEM, AND FACILITY MANAGEMENT SUPPORT METHOD

BACKGROUND

1. Technical Field

The present invention relates to a facility management support apparatus, a facility management support system, and a facility management support method, that support a user's task of managing a facility which provides a customer with goods or services.

2. Description of the Related Art

In stores such as convenience stores, opportunity loss, in other words, loss (lost profit) caused by customers losing opportunities to purchase goods due to circumstances of stores is a problem, and the opportunity loss has a great impact on the sale of the stores, such that there is a need to take measures to reduce the opportunity loss, specifically, measures for reviewing of the type of goods and a display method of goods for each sales floor. In considering such measures, first, the administrator needs to properly understand the circumstances of the opportunity loss in the store, in other words, whether or not the opportunity loss occurs, and what is a cause of the opportunity loss.

In a store management system having a large number of chain stores in the group, such as a franchise system of the convenience stores, a supervisor belonging to the headquarters that handles a plurality of stores is supposed to perform guidance and gives suggestions to the stores while patrolling the stores, and the supervisor performs a task of understanding the status of the opportunity loss of each store and suggests measures to reduce the opportunity loss to the administrator of each store, but in recent years, due to the large scale of the store management system, the number of stores that the supervisor manages has significantly increased, and variation occurs in the status of the opportunity loss of each store, such that a technology is desired by which the supervisor can efficiently perform the task for understanding the status of the opportunity loss of each store.

As a technology related to a task of an administrator of a store for understanding of the status of the opportunity loss of the store, in the related art, a technology is known in which a video of a sales floor where products are arranged for each type is captured by a camera, the number of customers staying at a sales floor is obtained for each sales floor by using the video, the number of sales for each product is obtained by using sales data in a POS system, and the number of customers staying at a sales floor and the number of sales are displayed with the video (see Japanese Patent Unexamined Publication No. 2013-210953). In addition, a technology is known in which the sales of products are aggregated for each of time slots based on the sales data in the POS system, and the status of sales in each timeslot is displayed with a list of videos of the sales floor for each timeslot (see Japanese Patent No. 5072985).

Other than the technologies in which a video of the sales floor is captured by a camera, and the sales floor management is performed in the backyard or the office of the store, there is a technology in which the display status and the sales status of products in each store are checked even in a remote location such as the headquarters (see Toshiba TEC Corporation, a sales floor management analysis system, a sales floor view, internet <URL: http://www.toshibatec.co.jp/products/retail/catalog/detail/uribaviur/>). In this technology, it is possible to compare the sales status of respective chain stores in the group simultaneously in a chronological order, and consider the status of the sales floor (the number of sales and the amount of sales) of a target store while watching the video (a still video).

SUMMARY

In the technology disclosed in Japanese Patent Unexamined Publication No. 2013-210953 and Japanese Patent No. 5072985, the number of customers staying at a sales floor or the number of sales of products are displayed with the video of a sales floor, such that it is possible to understand the status of the opportunity loss in each sales floor, from the display contents. However, in the related art, since the display contents for each sales floor is checked, it is possible to determine only the status of the opportunity loss in each sales floor. If the status of the opportunity loss is considered in detail after the status of the opportunity loss in the entire store is first understood, there is a problem of a significant reduction in the operational efficiency.

In the technology disclosed in Toshiba TEC Corporation, sales floor management analysis system, a sales floor view, internet <URL: http://www.toshibatec.co.jp/products/retail/catalog/detail/uribaviur/>, it is possible to compare and display the sales status of each branch in a group, as well as a specific store, thereby enabling support of the task of a supervisor. However, since the sales status of each store is simply compared in the related art, it is not possible to fully understand the status of the opportunity loss in the store, and the supervisor specifies a store where improvement is desired from among a large number of stores, such that there is a problem in that the supervisor cannot efficiently perform the task of considering improvements to reduce the opportunity loss.

The present invention has been made to solve the problems in the related art, and a main object is to provide a facility management support apparatus, a facility management support system, and a facility management support method, which are configured for the user to properly and quickly understand the status of the opportunity loss in the facility and efficiently perform a task of considering an improvement to reduce the opportunity loss, and in which it is possible to reduce the burden on the user who performs facility management targeting a very large number of facilities.

A facility management support apparatus according to the present invention is a facility management support apparatus that supports a user's task of managing a facility which provides a customer with goods or services, including a first quantity obtainer that obtains a first quantity associated with a customer for whom supply of goods or services from the facility is expected; a second quantity obtainer that obtains a second quantity associated with a customer who actually receives the supply of goods or services from the facility; a video obtainer that obtains a captured video of an inside of the facility; a statistical information generator that generates statistical information indicating temporal change in status of the first quantity and the second quantity; a display output controller that outputs display information in which the statistical information and the video of the inside of the facility are integrated and displayed, to a display device; and a timeslot evaluator that evaluates a necessity for attention in each timeslot, based on the first quantity and the second quantity, and determines an attention timeslot, in which the display output controller displays the statistical information along a time axis, and displays information indicating the attention timeslot in the display information.

A facility management support system according to the present invention is a facility management support system which supports a user's task of managing a facility which provides a customer with goods or services, including a camera that captures a video of an inside of the facility; and a plurality of information processing apparatuses, in which any of the plurality of information processing apparatuses includes a first quantity obtainer that obtains a first quantity associated with a customer for whom supply of goods or services is expected from the facility; a second quantity obtainer that obtains a second quantity associated with a customer who actually receives the supply of goods or services from the facility; a video obtainer that obtains a captured video of an inside of the facility; a statistical information generator that generates statistical information indicating temporal change in status of the first quantity and the second quantity; a display output controller that outputs display information in which the statistical information and a video of an inside of the facility are integrated and displayed, to a display device; and a timeslot evaluator that evaluates a necessity for attention in each timeslot, based on the first quantity and the second quantity, and determines an attention timeslot, in which the display output controller displays the statistical information along a time axis, and displays information indicating the attention timeslot in the display information.

A facility management support method according to the present invention is a facility management support method for performing a process of supporting a user's task of managing a facility which provides a customer with goods or services by using an information processing apparatus, including obtaining a first quantity associated with a customer for whom supply of goods or services from the facility is expected; obtaining a second quantity associated with a customer who actually receives the supply of goods or services from the facility; obtaining a captured video of an inside of the facility; generating statistical information indicating temporal change in status of the first quantity and the second quantity; outputting display information in which the statistical information and the video of an inside of the facility are integrated and displayed, to a display device; and evaluating a necessity for attention in each timeslot, based on the first quantity and the second quantity, and determining an attention timeslot, in which the outputting of the display information, the statistical information is displayed along a time axis, and information indicating the attention time slot is displayed in the display information.

According to the present invention, since the statistical information is displayed, the user can understand the status of the opportunity loss in the facility. Since the video of the inside of the facility is displayed, it is possible for the user to check the status of the opportunity loss in detail. The video of a selection point that is considered to be a problem based on the statistical information is quickly displayed, and thus it is possible to check the status of opportunity loss while comparing the statistical information with the video. Therefore, the user properly and quickly understands the status of the opportunity loss in the facility, and thus it is possible to efficiently perform a task of considering an improvement to reduce the opportunity loss.

BRIEF DESCRIPTION OF DRAWINGS

FIG. 1 is an overall configuration diagram of a facility management support system according to the present exemplary embodiment;

FIG. 9A is an explanatory diagram illustrating a processing conditions setting screen displayed on a monitor;

FIG. 9B is an explanatory diagram illustrating a processing conditions setting screen displayed on the monitor;

FIG. 19 is an explanatory diagram illustrating a video display screen that is displayed when a timeslot is selected on the trend analysis screens illustrated in FIG. 16 to FIG. 18;

DETAILED DESCRIPTION OF THE PREFERRED EMBODIMENTS

Figure 2A:
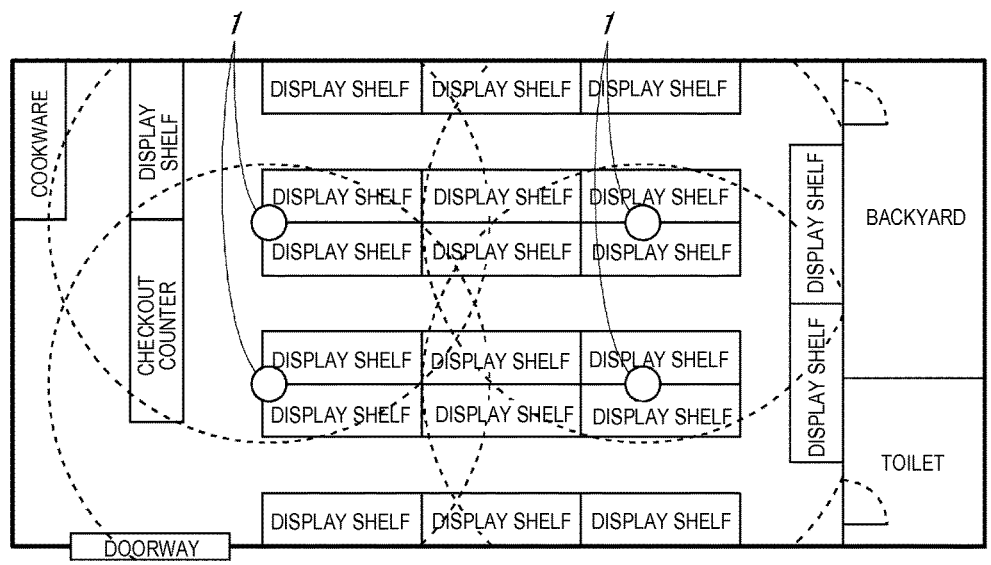
FIG. 2A is a plan view of a store illustrating the layout of the store and installation status of cameras.

A first aspect of the present invention is a facility management support apparatus that supports a user's task of managing a facility which provides a customer with goods or services, including: a first quantity obtainer that obtains a first quantity associated with a customer for whom supply of goods or services from the facility is expected; a second quantity obtainer that obtains a second quantity associated with a customer who actually receives the supply of goods or services from the facility; a video obtainer that obtains a captured video of an inside of the facility; a statistical information generator that generates statistical information indicating temporal change in status of the first quantity and the second quantity; a display output controller that outputs display information in which the statistical information and the video of the inside of the facility are integrated and displayed, to a display device; and a timeslot evaluator that evaluates a necessity for attention in each timeslot, based on the first quantity and the second quantity, and determines an attention timeslot, in which the display output controller displays the statistical information along a time axis, and displays information indicating the attention timeslot in the display information.

Thus, since the statistical information is displayed, the user can understand the status of the opportunity loss in the facility. Since the video of the inside of the facility is displayed, the user can check the status of the opportunity loss in detail. Since an attention timeslot that is considered to be a problem based on the statistical information is displayed, it is possible to draw attention from a viewer, and it is possible to check the status of the opportunity loss while comparing the statistical information and the video. Therefore, the user can efficiently perform a task of considering an improvement to reduce the opportunity loss by properly and quickly understanding the status of the opportunity loss in a facility.

In a second aspect of the present invention, the facility management support apparatus further includes an individual area setter that sets a plurality of individual areas in the facility, in which the first quantity obtainer obtains the first quantity targeting the entire facility, in which the second quantity obtainer obtains the second quantity targeting the entire facility, in which the video obtainer obtains respective captured videos of a plurality of individual areas, in which the statistical information generator generates the statistical information targeting the entire facility, and in which the display output controller integrates and displays the statistical information targeting the entire facility and a video of each of the plurality of individual areas.

Thus, the user can understand the status of the opportunity loss in the entire facility, from the statistical information targeting the entire facility. Since the video of each individual area is displayed while being integrated with the statistical information, the user can specifically check the status of the opportunity loss in detail.

In a third aspect of the present invention, the facility management support apparatus further includes an individual area setter that sets a plurality of individual areas in the facility, in which the first quantity obtainer obtains the first quantity targeting each of the plurality of individual areas, in which the second quantity obtainer obtains the second quantity targeting each of the plurality of individual areas, in which the video obtainer obtains respective captured videos of the plurality of individual areas, in which the statistical information generator generates the statistical information targeting each of the plurality of individual areas, and in which the display output controller integrates and displays the statistical information targeting one of the plurality of individual areas and a video of the individual area corresponding thereto.

Thus, the user can efficiently perform a task of checking the statistical information regarding an individual area and the status of the opportunity loss in the individual area in detail.

In a fourth aspect of the present invention, the first quantity obtainer obtains the number of customers who enter a store as the first quantity, and the number of customers who are on each of sales floors which are the plurality of individual areas, based on the captured video of the inside of the store which is the facility, the second quantity obtainer obtains sales information from a sales information management device that manages the sales information, obtains the number of customers who actually purchase products in the entire store as the second quantity and the number of customers who actually purchase products in each of the plurality of sales floors, based on the sales information, and the statistical information generator generates the statistical information targeting the entire facility, and the statistical information targeting each of the plurality of sales floors.

Thus, the user can understand the status of the opportunity loss in the entire store and the status of the opportunity loss in each sales floor.

In a fifth aspect of the present invention, the display output controller displays a selection point on the time axis of the statistical information, and displays a video corresponding to the selected selection point, in response to an operation of a user who selects the selection point.

Thus, the video of the selection point is quickly displayed, and thus it is possible to check the status of the opportunity loss, while comparing the statistical information with the video.

In a sixth aspect of the present invention, the timeslot evaluator evaluates a necessity for attention targeting the entire facility for each timeslot, based on a difference between the number of customers who enter the facility and the number of customers who actually receive the supply of goods or services from the facility.

Thus, it is possible to evaluate the necessity for attention for each timeslot targeting the entire facility.

In a seventh aspect of the present invention, the timeslot evaluator evaluates a necessity for attention targeting the individual areas for each timeslot, based on a difference between the number of customers who are in the individual areas and the number of customers who actually receive the supply of goods or services from the individual areas, or a difference between the number of customers who enter the facility and the number of customers who are in the individual areas.

Thus, it is possible to properly evaluate the necessity for attention for each timeslot targeting each of individual areas.

In an eighth aspect of the present invention, the first quantity obtainer obtains the first quantity targeting each of the plurality of individual areas, the second quantity obtainer obtains the second quantity targeting each of the plurality of individual areas, the facility management support apparatus further includes an individual area evaluator that evaluates a necessity for attention for each of the plurality of individual areas based on the first quantity and the second quantity, and determines individual areas for attention, and the display output controller highlights videos of the individual areas for attention.

Thus, since the video of the individual area can be displayed by quickly selecting the individual attention area, without viewing the statistical information of the individual area, the user can efficiently perform a task of specifically checking the status of the opportunity loss in each individual area by using the video.

In a ninth aspect of the present invention, the first quantity obtainer obtains the first quantity targeting each of the plurality of individual areas, the second quantity obtainer obtains the second quantity targeting each of the plurality of individual areas, the facility management support apparatus further includes an individual area evaluator that evaluates a necessity for attention for each of the plurality of individual areas based on the first quantity and the second quantity and gives priority to the individual areas in a descending order of the necessity for attention, and the display output controller arranges and displays videos of the individual areas in a descending order of the priority.

Thus, since the video of the individual area can be displayed by quickly selecting the individual area having a high degree of necessity for attention, without viewing the statistical information of the individual area, the user can efficiently perform a task of specifically checking the status of the opportunity loss in each individual area by using the video.

In a tenth aspect of the present invention, the individual area evaluator evaluates a necessity for attention for each of the plurality of individual areas, based on a difference between the number of customers who are in the individual area and the number of customers who actually receive the supply of goods or services from the individual area, or a difference between the number of customers who enter the facility and the number of customers who are in the individual area.

Thus, it is possible to properly evaluate the necessity for attention of each individual area.

In an eleventh aspect of the present invention, the facility management support apparatus further includes a facility evaluator that evaluates a necessity for attention for each of the plurality of facilities, based on the first quantity and the second quantity and gives priority to the facilities in a descending order of the necessity for attention, in which the display output controller arranges and displays choices of the plurality of facilities according to the priority, and outputs the statistical information regarding the selected facility and the video of the inside of the facility in response to an operation to select a choice of the facility, to the display device.

Thus, since the statistical information regarding each facility is displayed, the user can understand the status of the opportunity loss in each facility. Since a facility having a high degree of necessity for attention is quickly selected and the statistical information and the video of the facility can be displayed, the user can efficiently perform a task of checking the status of the opportunity loss. Since the statistical information pieces and the videos of respective facilities are compared with each other, the user can efficiently perform a task of specifying a facility for which improvement is desired, from the facilities. Thus, the user can efficiently perform a task of considering an improvement to reduce the opportunity loss in each facility, and it is possible to reduce the burden of the user who performs facility management targeting a very large number of facilities.

In a twelfth aspect of the present invention, the facility evaluator evaluates a necessity for attention for each of the plurality of facilities, based on a difference between the number of customers who enter the facility and the number of customers who actually receive the supply of goods or services from the facility.

Thus, it is possible to properly evaluate the necessity for attention of each facility.

In a thirteenth aspect of the present invention, the facility management support apparatus further includes an individual area setter that sets important individual areas in the facility, in which the first quantity obtainer obtains the first quantity targeting the important individual areas, in which the second quantity obtainer obtains the second quantity targeting the important individual areas, and in which the facility evaluator evaluates a necessity for attention for each of the plurality of facilities, based on the first quantity and the second quantity.

Thus, it is possible to properly evaluate the necessity for attention of each facility.

In a fourteenth aspect of the present invention, the facility evaluator evaluates a necessity for attention for each of the plurality of facilities, based on a difference between the number of customers who are on the important individual areas and the number of customers who actually receive the supply of goods or services from the important individual areas, or a difference between the number of customers who enter the facility and the number of customers who are on the important individual areas.

Thus, it is possible to properly evaluate the necessity for attention of each facility.

In a fifteenth aspect of the present invention, the statistical information generator generates the statistical information in which summary totals of the first quantity and the second quantity for each timeslot are arranged in time series, and generates the statistical information in which summary totals for each predetermined unit time period that is longer than the timeslot are arranged in time series, and the display output controller displays the statistical information regarding the summary total for each unit time period.

Thus, since the statistical information regarding the summary total for each unit time period that is longer than the timeslot is displayed, the user can understand the status of the opportunity loss in the facility for the unit time period that is longer than the timeslot, and the user can understand the transition trend over a long period of time of the status of the opportunity loss.

In a sixteenth aspect of the present invention, the display output controller displays the statistical information regarding the summary total for each unit time period along a time axis, displays a selection point on the time axis, and displays a video of the inside of the facility corresponding to the selected selection point, in response to an operation of a user who selects the selection point.

Thus, since the video of the inside of the facility corresponding to the selection point that is considered to be a problem based on the statistical information can be quickly displayed, the user can properly and quickly understand the status of the opportunity loss in the facility.

A seventeenth aspect of the present invention is a facility management support system which supports a user's task of managing a facility which provides a customer with goods or services, including a camera that captures a video of an inside of the facility; and a plurality of information processing apparatuses, in which any of the plurality of information processing apparatuses includes a first quantity obtainer that obtains a first quantity associated with a customer for whom supply of goods or services is expected from the facility; a second quantity obtainer that obtains a second quantity associated with a customer who actually receives the supply of goods or services from the facility; a video obtainer that obtains a captured video of an inside of the facility; a statistical information generator that generates statistical information indicating temporal change in status of the first quantity and the second quantity; a display output controller that outputs display information in which the statistical information and a video of an inside of the facility are integrated and displayed, to a display device; and a timeslot evaluator that evaluates a necessity for attention in each timeslot, based on the first quantity and the second quantity, and determines an attention timeslot, in which the display output controller displays the statistical information along a time axis, and displays information indicating the attention timeslot in the display information.

Thus, similarly to the first aspect of the invention, the user can efficiently perform a task of considering an improvement to reduce the opportunity loss, by properly and quickly understanding the status of the opportunity loss in the facility.

In an eighteenth aspect of the present invention, the facility management support system further includes a facility evaluator that evaluates a necessity for attention for each of the plurality of facilities, based on the first quantity and the second quantity, and gives priority to the facilities in a descending order of the necessity for attention, in which the display output controller arranges and displays choices of the plurality of facilities according to the priority, and outputs the statistical information regarding the selected facility and the video of the inside of the facility, in response to an operation to select a choice of the facility, to the display device.

Thus, similarly to the eleventh aspect of the invention, the user can efficiently perform a task of considering an improvement to reduce the opportunity loss in each facility, by properly and quickly understanding the status of the opportunity loss in each facility, and it is possible to reduce the burden of the user who performs facility management targeting a very large number of facilities.

A nineteenth aspect of the present invention is a facility management support method for performing a process of supporting a user's task of managing a facility which provides a customer with goods or services by using an information processing apparatus, including obtaining a first quantity associated with a customer for whom supply of goods or services from the facility is expected; obtaining a second quantity associated with a customer who actually receives the supply of goods or services from the facility; obtaining a captured video of an inside of the facility; generating statistical information indicating temporal change in status of the first quantity and the second quantity; outputting display information in which the statistical information and the video of an inside of the facility are integrated and displayed, to a display device; and evaluating a necessity for attention in each timeslot, based on the first quantity and the second quantity, and determining an attention timeslot, in which in the outputting of the display information, the statistical information is displayed along a time axis, and information indicating the attention timeslot is displayed in the display information.

Thus, similarly to the first aspect of the invention, the user can efficiently perform a task of considering an improvement to reduce the opportunity loss, by properly and quickly understanding the status of the opportunity loss in the facility.

In a twentieth aspect of the present invention, the facility management support method further includes evaluating a necessity for attention for each of the plurality of facilities, based on the first quantity and the second quantity, and giving priority to the facility in a descending order of the necessity for attention, in which in the outputting of the display information, choices of the plurality of facilities are arranged and displayed according to the priority, and the statistical information regarding the selected facility and the video of the inside of the facility are output, in response to an operation to select a choice of the facility, to the display device.

Thus, similarly to the eleventh aspect of the invention, the user can efficiently perform a task of considering an improvement to reduce the opportunity loss in each facility, by properly and quickly understanding the status of the opportunity loss in each facility, and it is possible to reduce the burden of the user who performs facility management targeting a very large number of facilities.

Hereinafter, exemplary embodiments of the present invention will be described with reference to the drawings.

First Exemplary Embodiment

FIG. 1 is an overall configuration diagram of a facility management support system according to the present exemplary embodiment. The facility management support system is constructed for retail chain stores such as convenience stores, and includes cameras 1, recorder (video storage device) 2, PC 3, and POS terminal (sales information management device) 4 which are installed in each of a plurality of stores, and PC 11 and POS server (sales information management device) 12 which are installed in the headquarters that handles the plurality of stores.

Cameras 1 are provided in suitable positions in the store and capture a video of the inside of the store, and the captured videos are stored in recorder 2. The videos of the inside of the store that are captured by camera 1 can be viewed in a real time, and the videos of the inside of the store of the past that are stored in recorder 2 can be viewed, in PC 3 installed in the store and PC 11 installed in the headquarters, such that it is possible to check the status inside the store in the store or the headquarters.

PC 11 installed in the headquarters is a facility management support apparatus that supports the task of a supervisor who manages the stores. The supervisor can view information generated in PC 11, on PC 11 itself. The information is transmitted to PC 3 installed in the store, and can be viewed by a store manager even on PC 3. PCs 3 and 11 are browsing devices.

POS terminal 4 is installed in a checkout counter of the store, and is operated by a sales clerk when the accounting of a product that has been purchased by a customer is performed. POS terminal 4 and a POS server 12 that is installed in the headquarters are point of sale (POS) systems (sales information management systems) that manage sales information regarding sales in each store. In the POS system, the information such as the name, the type, the quantity, the amount of money, and an accounting time of the products purchased by the customer is managed as the sales information. The sales information is shared between POS terminal 4 and POS server 12, POS terminal 4 manages the sales information of the store having POS terminal 4 provided, and POS sever 12 manages the sales information of the entire store.

Figure 2B:
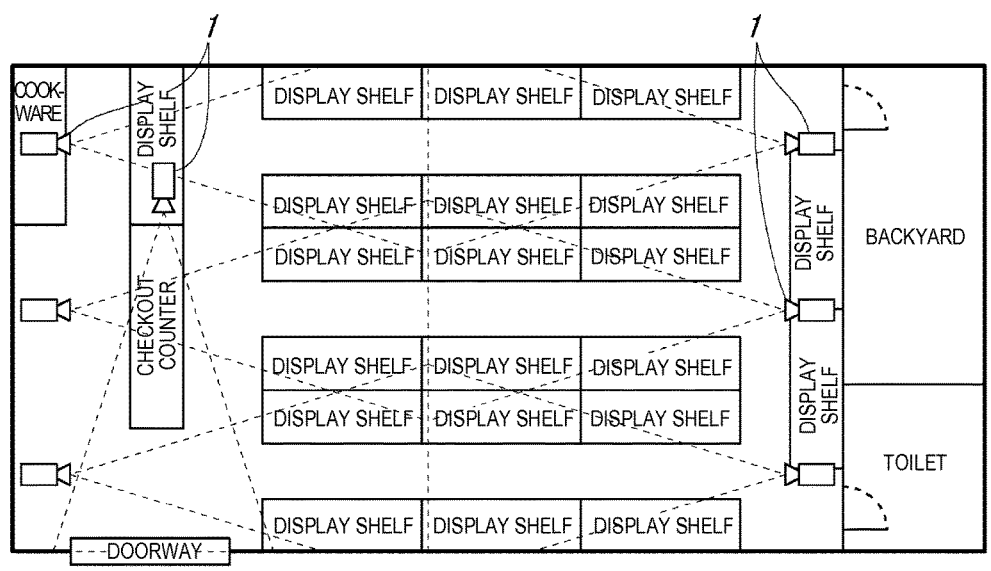
FIG. 2B is a plan view of a store illustrating the layout of the store and installation status of cameras.

Next, the layout of the store and the installation status of the cameras 1 will be described by using a convenience store. FIG. 2A and FIG. 2B are plan views of a store illustrating the layout of a store and the installation status of the cameras 1.

Doorways, display shelves, checkout counters, and cookware are provided in the store. The display shelves are installed while being divided into the type of products, such as fast food, cooked rice (products such as rice balls, lunch boxes, and sushi), processed food, general merchandise, fresh foods, checkout counters, magazines, ice and newspapers. The cookware is used to cook fast food such as fried chicken in the store, and display shelves of fast food are installed next to the checkout counter. Customers enter from the doorway, and move in the store through the passage between the display shelves. If the user finds desired products, the user goes to the checkout counter while carrying the products, finishes accounting (payment of the price) at the checkout counter, and thereafter the user exits from the doorway.

A plurality of cameras 1 that capture a video of the inside of the store are installed in the store. Particularly, an omnidirectional camera having an imaging range of 360 degrees by using a fisheye lens is employed as camera 1 in the example illustrated in FIG. 2A, a camera having a predetermined an angle of view, a so-called box camera being employed as camera 1 in the example illustrated in FIG. 2B. These cameras 1 are installed on the ceiling above the display shelves and the checkout counter that are provided in the sales floor, and can capture a video of the whole sales floor.

Figure 3:
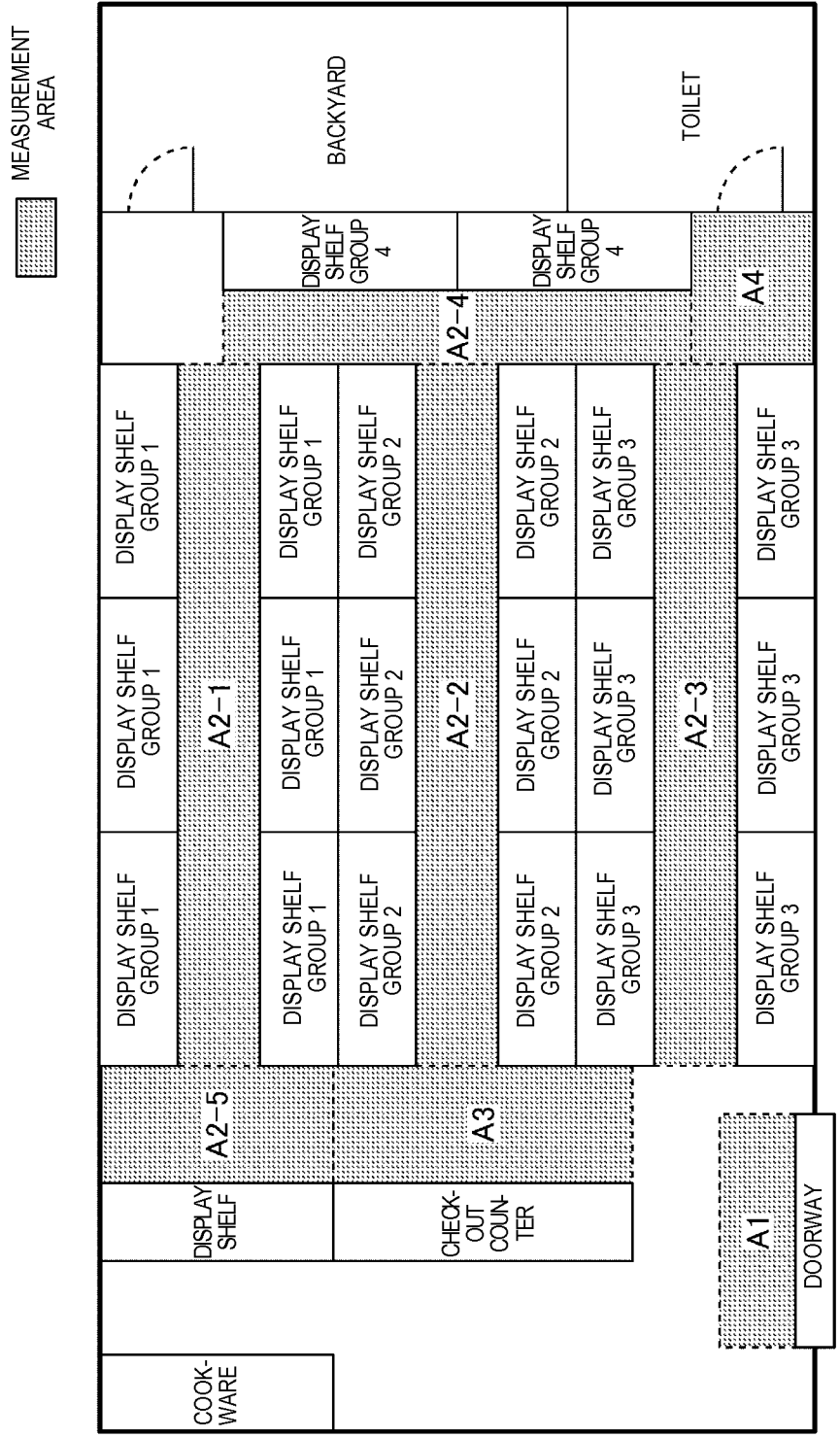
FIG. 3 is a plan view of a store illustrating measurement areas that are set in the store.

Next, a description will be made regarding a measurement area that is set in the store. FIG. 3 is a plan view of a store illustrating the measurement area that is set in the store.

Measurement area A1, through which customers pass when the customers enter and exit the store, is set on the store side of the doorway of the store. It is possible to detect customers who enter the store, based on the video of measurement area A1. In this exemplary embodiment, the number of customers who enter the store (the number of entering customers) is measured based on the detection result of the customers in measurement area A1.

Measurement areas A2-1 to A2-5 are set between the display shelves in the sales floor. Measurement areas A2-1 to A2-5 are sales floors which are separated for each type of products, and it is possible to detect customers who are on each sales floor based on each of the videos of measurement areas A2-1 to A2-5. In this exemplary embodiment, the number of customers who are on each sales floor (the number of customers staying at a sales floor) is measured based on the detection result of the customers in measurement areas A2-1 to A2-5.

In the example illustrated in FIG. 3, other than measurement areas A1, and A2-1 to A2-5, measurement area A3 where customers waiting for accounting when the customers pay the check is set on the sales floor side of the checkout counter. Measurement area A4, through which customers pass when the customers use a toilet, is set on the sales floor side of the doorway of the toilet. Thus, it is possible to detect customers who use the toilet or wait for the accounting.

Figure 4:
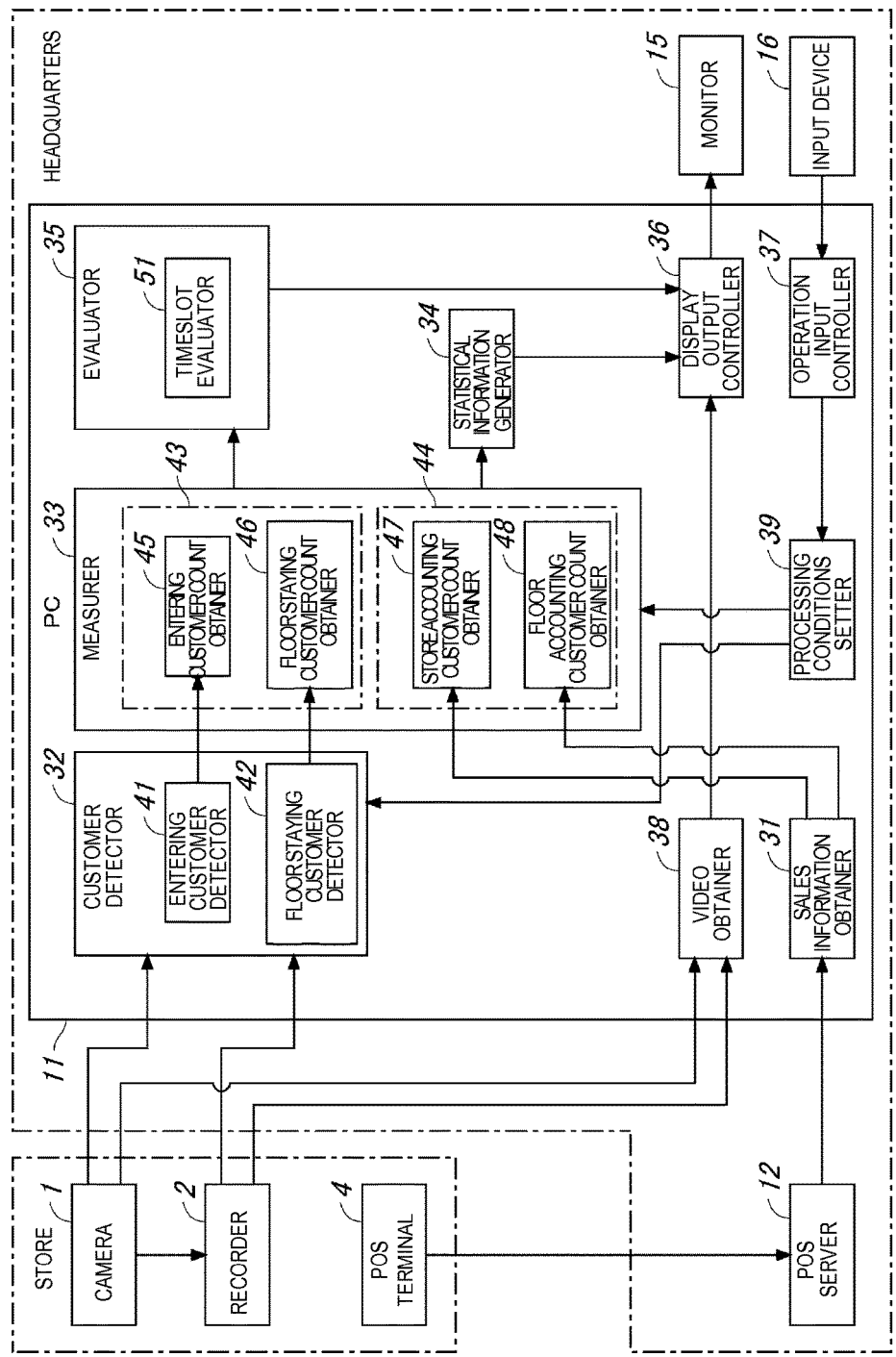
FIG. 4 is a functional block diagram illustrating a schematic configuration of a PC which is installed in the headquarters.

Next, a description will be made regarding a store management support process performed in PC 11 installed in the headquarters illustrated in FIG. 1. FIG. 4 is a functional block diagram illustrating a schematic configuration of PC 11 installed in the headquarters.

PC 11 includes sales information obtainer 31, customer detector 32, measurer 33, statistical information generator 34, evaluator 35, display output controller 36, operation input controller 37, video obtainer 38, and processing conditions setter (individual area setter) 39.

Sales information obtainer 31 obtains sales information from POS server 12. The sales information contains an accounting time of each customer (issue time of a receipt), and information such as the name, the type, the amount of money, and quantity of the product purchased by the customer. It is possible to obtain sales information from POS terminal 4 installed in the store.

Customer detector 32 detects customers by a person detection process of detecting a person from the video, and includes entering customer detector 41, and floor staying customer detector 42. A known video analysis technology may be used for the process performed by customer detector 32.

In entering customer detector 41, a process of detecting the customers entering from the doorway is performed, by a person detection process of detecting a person from the video of the doorway that camera 1 captures. Entering customer detector 41 obtains the entering time of each customer, from the shooting time of the video from which the customers entering from the doorway are detected.

In this exemplary embodiment, entering customer detector 41 is intended to detect customers who enter the store, but without being limited to detecting the customers who enter from the doorway, entering customer detector 41 may detect customers who are in the store.

In floor staying customer detector 42, a process of detecting the customers who are on each sales floor in the store is performed, by a person detection process of detecting a person, from the captured video of the inside of the store. Floor staying customer detector 42 obtains the time during which the customers are on the sales floor for each sales floor, from the shooting time of the video from which the customers staying at each sales floor are detected. The process performed in floor staying customer detector 42 will be described in detail later.

In the present exemplary embodiment, since person recognition (personal identification) is not performed, if the same person enters the sales floor a plurality of times, the person is detected in duplicate, but person recognition may be performed in order to avoid the duplication.

Measurer 33 measures the number of customers for a predetermined measurement period of time (for 15 minutes), based on the detection result in customer detector 32 and sales information obtained in sales information obtainer 31, and includes first quantity obtainer 43 and second quantity obtainer 44. First quantity obtainer 43 includes entering customer count obtainer 45 and floor staying customer count obtainer 46. Second quantity obtainer 44 includes store accounting customer count obtainer 47 and floor accounting customer count obtainer 48.

Entering customer count obtainer 45 performs a process of obtaining the number of entering customers at each predetermined measurement period of time, in other words, the number of customers who enter the store in a measurement period of time, based on the entering time of each customer obtained in entering customer detector 41.

Floor staying customer count obtainer 46 performs a process of obtaining the number of customers staying at a sales floor at each predetermined measurement period of time, in other words, the number of customers who are on the sales floor in each sales floor, based on the time during which each customer is on the sales floor which is obtained by floor staying customer detector 42.

Store accounting customer count obtainer 47 performs a process of obtaining the number of paying customers in a store at each predetermined measurement period of time, in other words, the number of customers that perform the accounting in the entire store in a measurement period of time, in other words, the number of customers who purchase any of products in the store, based on the accounting time of each customer that is obtained in sales information obtainer 31. The number of paying customers in a store is the number of receipts that are issued in the store.

Floor accounting customer count obtainer 48 performs a process of obtaining the number of paying customers in a sales floor at each predetermined measurement period of time, in other words, the number of customers that perform the accounting for the products in each sales floor in a measurement period of time, in other words, the number of customers who purchase any of products in each sales floor, based on the accounting time of each customer that is obtained in sales information obtainer 31. The customer who purchases products in different sales floors at the same time is measured in duplicate in each sales floor.

Statistical information generator 34 performs a process of aggregating the measured values (the number of entering customers, the number of customers staying at a sales floor, the number of paying customers in a store, and the number of paying customers in a sales floor) obtained at each measurement period of time (for 15 minutes) in measurer 33 at every predetermined unit time period and obtaining the number of customers at every unit time period, and generating statistical information indicating the temporal change in status of the number of customers.

In the present exemplary embodiment, in statistical information generator 34, the unit time period is a timeslot for performing an aggregation process, but the unit time period may be one day, one week, and one month. In the present exemplary embodiment, in measurer 33, the measurement period of time is set to 15 minutes, and the number of customers (the number of entering customers, the number of customers staying at a sales floor, the number of paying customers in a store, and the number of paying customers in a sales floor) is obtained at every measurement period of time, but the measurement period of time may be one hour. Here, if the measurement period of time is set to one hour, an aggregation process of aggregating the number of customers at every timeslot (1 hour) is not necessary.

Evaluator 35 includes timeslot evaluator 51. Timeslot evaluator 51 performs a process of evaluating a necessity for attention after recognizing the status of the opportunity loss based on the measured value obtained in measurer 33 (the number of entering customers, the number of customers staying at a sales floor, the number of paying customers in a store, and the number of paying customers in a sales floor), for each timeslot, and determining an attention timeslot.

In the present exemplary embodiment, a process is performed for obtaining an evaluation value targeting the entire store for each timeslot, and determining whether or not there is an attention timeslot in the store, based on the evaluation value. Here, the attention attracting timeslot is displayed in the form of attracting attention from the viewer, on the store monitoring screen (see FIG. 10 and the like). In the present exemplary embodiment, a process is performed for obtaining an evaluation value targeting each sales floor for each timeslot, and determining whether or not there is an attention timeslot in the sales floor, based on the evaluation value. Here, the attention attracting timeslot is displayed in the form of attracting attention from the viewer, on the sales floor monitoring screen (see FIG. 12 and the like). The process performed in timeslot evaluator 51 will be described in detail later.

Video obtainer 38 obtains a captured video of the inside of the store, from camera 1 and recorder 2. Here, in the case of displaying the status of the corresponding day in real time, a video is obtained from camera 1, and in the case of displaying the status for a predetermined period of time in the past, a video is obtained from recorder 2.

Display output controller 36 performs a process of outputting display information in which the statistical information generated by statistical information generator 34 and a video of the inside of the store obtained from video obtainer 38 are displayed, to monitor (display device) 15. In the present exemplary embodiment, display information in which the statistical information and the video of the inside of the store are integrated and displayed is output. In the present exemplary embodiment, a process is performed for generating a graph from the statistical information generated by statistical information generator 34. Thus, the store monitoring screen (see FIG. 10 and the like) and the sales floor monitoring screen (see FIG. 12 and the like) are displayed on monitor 15. Otherwise, display output controller 36 performs a process of displaying the processing conditions setting screens (see FIG. 9A and FIG. 9B) and the trend analysis screen (see FIG. 16 and the like) on monitor 15.

Operation input controller 37 in association with display output controller 36 constitutes a Graphical User Interface (GUI), and obtains input information in response to the input operation performed on the screen displayed on monitor 15 by display output controller 36, by the user using input device 16 such as a mouse and a keyboard.

Processing conditions setter 39 performs a process of setting process conditions in response to the input operation performed by the user using input device 16. In the present exemplary embodiment, measurement areas (see FIG. 3) corresponding to the sales floors are set. At this time, an area setting screen displaying a layout diagram of a store may be displayed on monitor 15, and a position of the measurement area may be input on the area setting screen. In the present exemplary embodiment, an important sales floor is set. Here, the important sales floor is a sales floor that most contributes to the sales of the store, and in the case of a convenience store, usually, the important sales floor is a sales floor for cooked rice such as lunch boxes.

Figure 6:
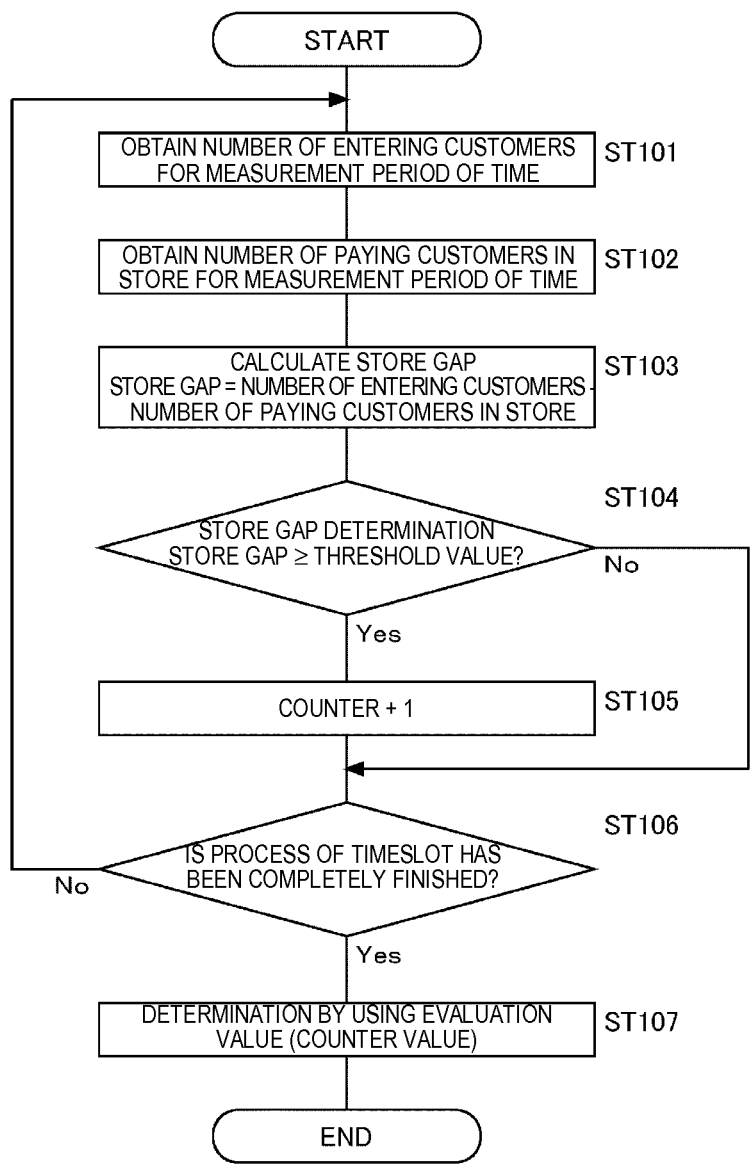
FIG. 6 is a flowchart illustrating a procedure of an evaluation process targeting an entire store that is performed by a timeslot evaluator.
Figure 7:
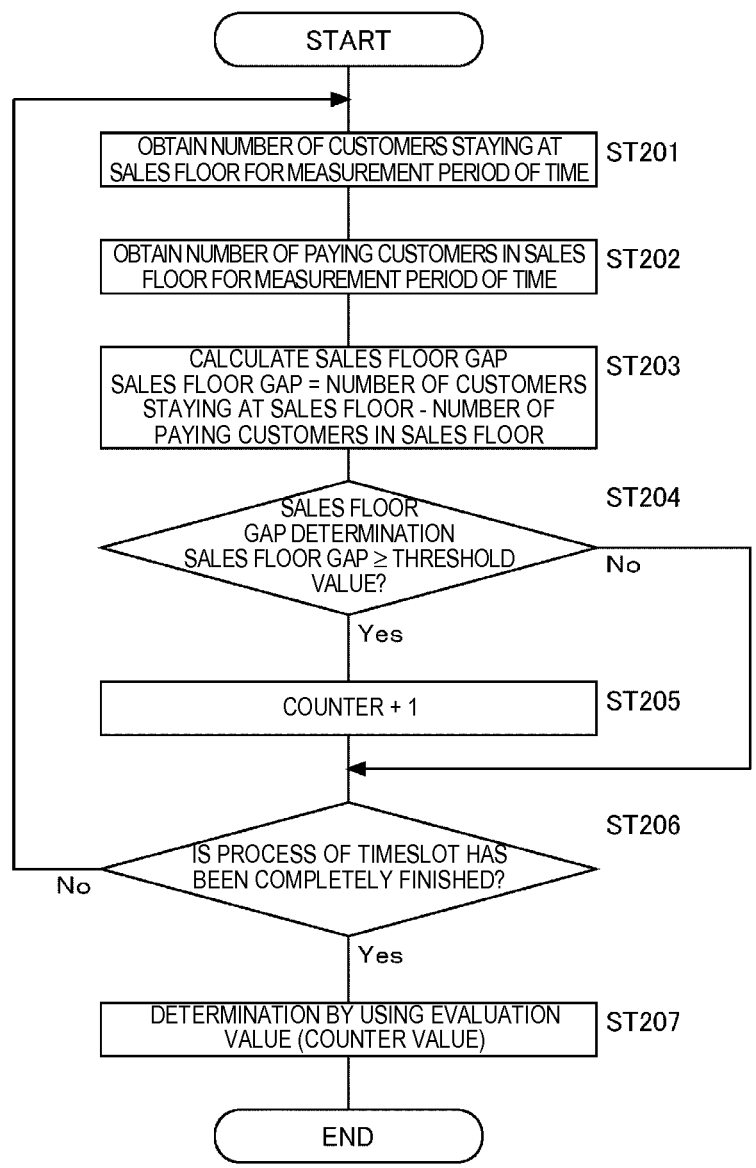
FIG. 7 is a flowchart illustrating the procedure of an evaluation process targeting each sales floor that is performed by the timeslot evaluator.
Figure 8:
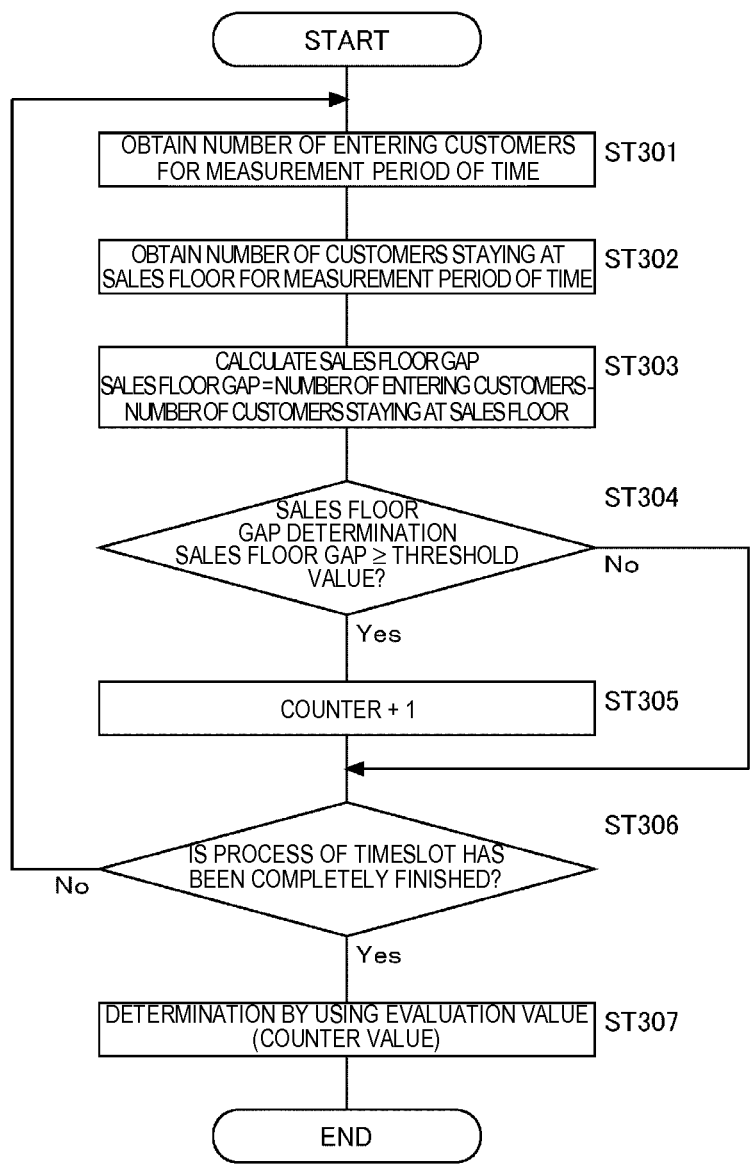
FIG. 8 is a flowchart illustrating the procedure of an evaluation process targeting each sales floor that is performed by the timeslot evaluator.
Figure 10:
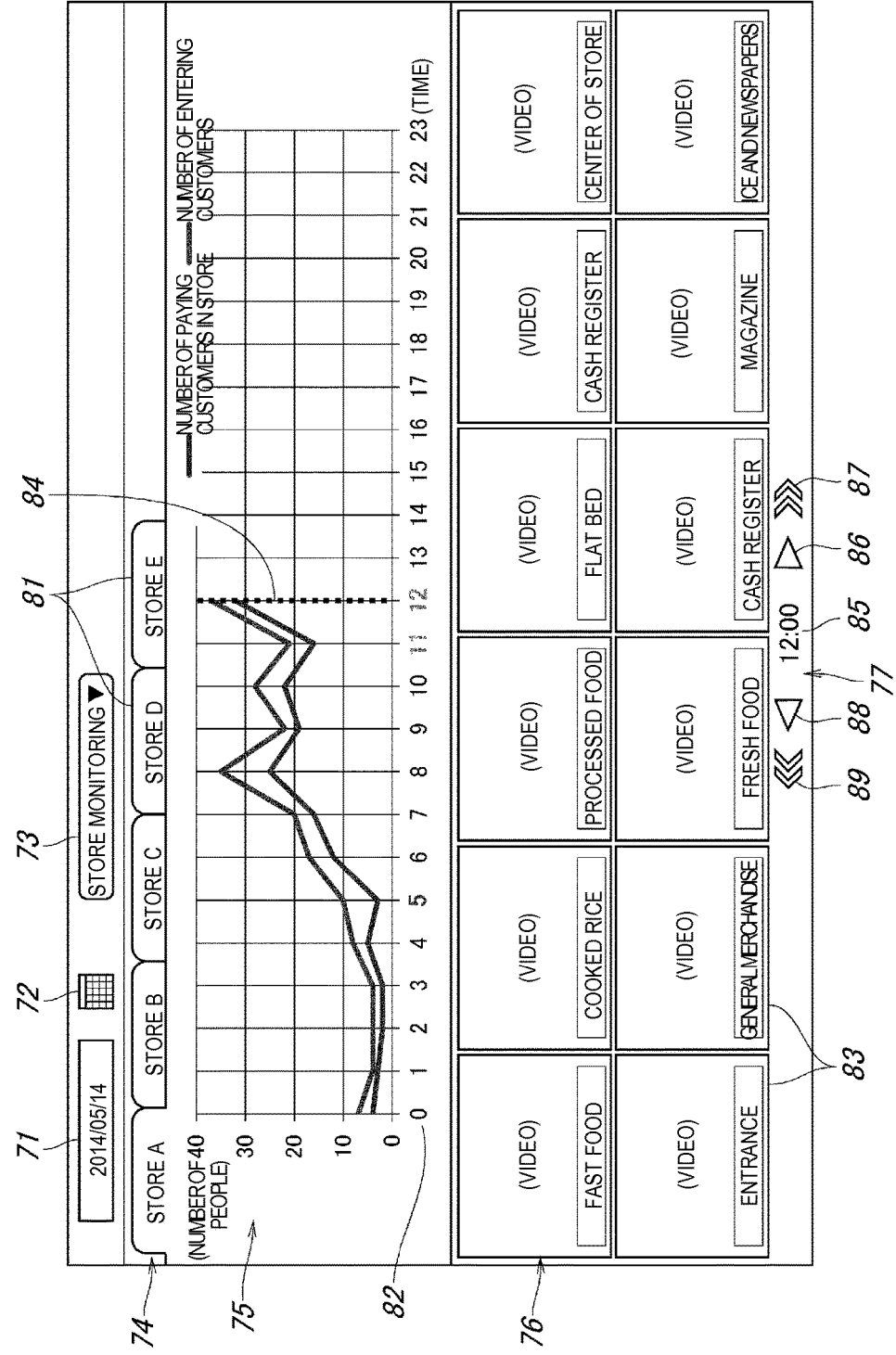
FIG. 10 is an explanatory diagram illustrating a store monitoring screen displayed on the monitor.

In the present exemplary embodiment, by using the processing conditions setting screens (see FIG. 9A and FIG. 9B) displayed on monitor 15, threshold values used for store gap determination and sales floor gap determination illustrated in FIG. 6 to FIG. 8, and the timeslot for task check displayed on the monitoring screen illustrated in FIG. 10 and the like are set. The store gap determination, the sales floor gap determination, and the monitoring screen will be described in detail later.

Respective units of PC 11 illustrated in FIG. 3 are realized by the CPU of PC 11 executing a program for facility management support. In addition to forming a dedicated apparatus by introducing the program in advance into PC 11 which is an information processing apparatus, the program may be supplied to the user by being recorded as an application program operating on a general purpose OS on an appropriate program recording medium, or through a network.

Figure 5:
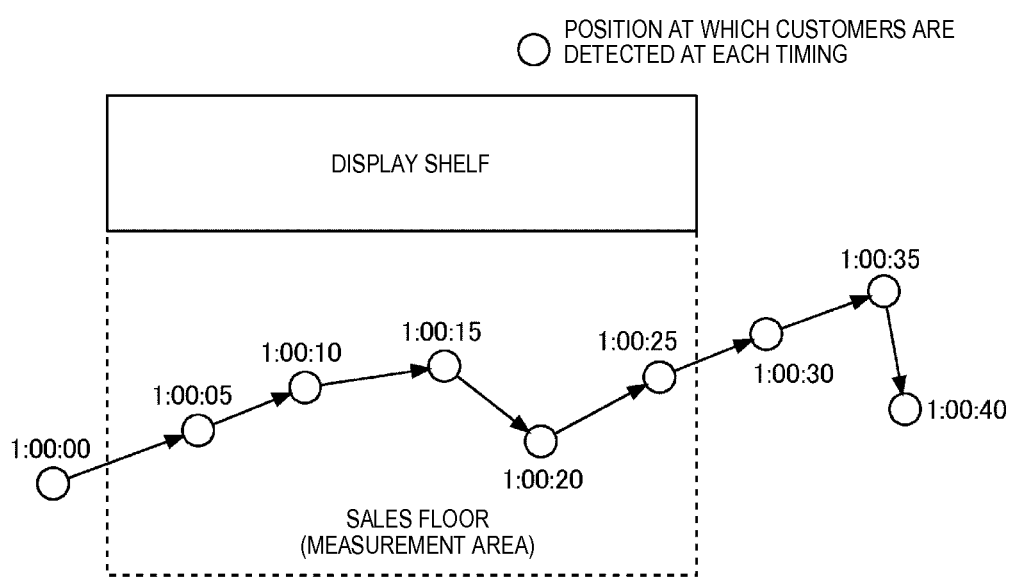
FIG. 5 is an explanatory diagram for explaining the procedure of a process performed by a floor staying customer detector.

Next, a process performed by floor staying customer detector 42 illustrated in FIG. 4 will be described. FIG. 5 is an explanatory diagram for explaining the procedure of a process performed by floor staying customer detector 42.

In the present exemplary embodiment, floor staying customer detector 42 performs a process of detecting people who stay at the sales floor, in other words, people who are present in the measurement area corresponding to each sales floor for a predetermined time. Specifically, an elapsed time from an entry timing when the person has entered the measurement area to an exit timing when the person has left the measurement area, in other words, a staying time in the measurement area is measured, and it is determined whether or not a person stays in the sales floor by comparing the staying time with a threshold value (for example, 10 seconds). If the threshold value is 10 seconds, in the example illustrated in FIG. 5, the staying time is 20 seconds (1:00:05 to 1:00:25), such that it is determined that a person stays in the sales floor.

In this manner, in the present exemplary embodiment, a threshold value is set to the staying time in the measurement area corresponding to each sales floor, and when the staying time exceeds the threshold value, the customer staying at the sales floor is detected, thus, it is possible to detect only customers who have interest in products that are displayed on the sales floor, while excluding customers who have passed through the sales floor.

Although entering customer detector 41 detects a customer entering from the doorway, in this case, an image of a measurement line may be set on a video of measurement area A1 (see FIG. 3) that is captured by camera 1, and a person who has passed through the measurement line may be detected.

Next, an evaluation process targeting the entire store that is performed by timeslot evaluator 51 illustrated in FIG. 4 will be described. FIG. 6 is a flowchart illustrating a procedure of the evaluation process targeting the entire store that is performed by timeslot evaluator 51.

In the present exemplary embodiment, timeslot evaluator 51 performs a process of obtaining an evaluation value targeting the entire store for each timeslot, and determining whether or not there is an attention timeslot for the entire store, by using the evaluation value. In the process, a store gap determination as to whether or not the store gap is a predetermined threshold value or more is performed. In the present exemplary embodiment, the store gap determination is performed a plurality of times (4 times) with respect to one timeslot, based on the measured value at each measurement period of time (for 15 minutes) obtained by measurer 33, and the evaluation value of the timeslot is obtained based on the result of the store gap determination for each measurement period of time.

In the example of FIG. 6, the store gap is a difference between the number of entering customers and the number of paying customers in a store, and the store gap determination is performed based on the measured values which are respectively obtained in entering customer count obtainer 45 and store accounting customer count obtainer 47, in other words, the number of entering customers and the number of paying customers in a store.

Specifically, first, entering customer count obtainer 45 and store accounting customer count obtainer 47 obtain the number of entering customers and the number of paying customers in a store for a first measurement period of time in one timeslot (ST101 and ST102). Next, timeslot evaluator 51 calculates a store gap from the number of entering customers and the number of paying customers in a store for the measurement period of time (ST103). The store gap determination as to whether or not the store gap is a predetermined threshold value or more is performed (ST104). Here, if the store gap is the threshold value or more (Yes in ST104), the counter value is increased by one (ST105).

Next, a determination as to whether a process for one timeslot has been completely finished is performed (ST106), and if the process of one timeslot has not been completely finished (No in ST106), a process proceeds to a next measurement period of time. Meanwhile, if the process of one timeslot has been completely finished (Yes in ST106), a process proceeds to a determination process as to whether or not the timeslot is an attention timeslot (ST107).

In the determination process (ST107), the determination process as to whether or not the timeslot is an attention timeslot is performed by using the evaluation value of the timeslot, with a counter value as the evaluation value of the timeslot. Specifically, the evaluation value of the timeslot is compared with a predetermined threshold value (for example, 2), and a determination is made as to whether or not the timeslot is an attention timeslot. In the present exemplary embodiment, since the store gap determination is performed four times in one timeslot (for one hour), the evaluation value (counter value) is any value of 0 to 4.

The above process is performed for each timeslot, and the attention timeslots are determined.

Next, an evaluation process targeting each sales floor performed by timeslot evaluator 51 illustrated in FIG. 4 will be described. FIG. 7 and FIG. 8 are flowcharts illustrating a procedure of the evaluation process targeting each sales floor performed by timeslot evaluator 51.

In the present exemplary embodiment, timeslot evaluator 51 performs a process of obtaining an evaluation value targeting each sales floor for each timeslot, and determining whether or not there is an attention timeslot for the sales floor by using the evaluation value. In the process, a sales floor gap determination as to whether or not the sales floor gap is a predetermined threshold value or more is performed. In the present exemplary embodiment, the sales floor gap determination is performed a plurality of times (4 times) with respect to one timeslot, based on the measured value at each measurement period of time (for 15 minutes) obtained by measurer 33, and the evaluation value of the timeslot is obtained based on the result of the sales floor gap determination for each measurement period of time.

In the example illustrated in FIG. 7, the sales floor gap is a difference between the number of customers staying at a sales floor and the number of paying customers in a sales floor, and the store gap determination is performed based on the measured values which are obtained by floor staying customer count obtainer 46 and floor accounting customer count obtainer 48, in other words, the number of customers staying at a sales floor and the number of paying customers in a sales floor. In this case, the sales floor gap (a difference between the number of customers staying at a sales floor and the number of paying customers in a sales floor) is a sales floor purchase rate, in other words, that which indicates how many customers among the customers staying at the sales floor have purchased products in the sales floor.

In the example of FIG. 8, the sales floor gap is a difference between the number of entering customers and the number of customers staying at a sales floor, and the store gap determination is performed based on the measured values which are respectively obtained by entering customer count obtainer 45 and floor staying customer count obtainer 46, in other words, the number of entering customers and the number of customers staying at a sales floor. In this case, the sales floor gap (a difference between the number of entering customers and the number of customers staying at a sales floor) is a stop-by rate for a sales floor, in other words, that which indicates how many customers stay at the sales floor out of customers who enter the store.

Specific procedures of an evaluation value obtaining process (ST201 to ST206) illustrated in FIG. 7 and an evaluation value obtaining process (ST301 to ST306) illustrated in FIG. 8 are generally similar to the example illustrated in FIG. 6, and a description thereof will be omitted.

The determination process (ST207 and ST307) is generally similar to the example illustrated in FIG. 6, and if the evaluation value of the timeslot (counter value) is obtained, whether or not there is an attention timeslot is determined by comparing the evaluation value of the timeslot with a predetermined threshold value (for example, 2).

In the present exemplary embodiment, the evaluation value of one timeslot is obtained by performing the store gap determination and the sales floor gap determination a plurality of times (4 times) based on the measured value at every measurement period of time (for 15 minutes) for one timeslot, but the measured values for each measurement period of time may be aggregated in a timeslot, and the store gap determination and the sales floor gap determination may be performed with the summary total. In this case, the store gap determination and the sales floor gap determination are performed once, and through the one time determination, whether or not there is an attention timeslot is determined.

Next, a processing conditions setting process performed by processing conditions setter 39 illustrated in FIG. 4 will be described. FIG. 9A and FIG. 9B are explanatory diagrams illustrating a processing conditions setting screen displayed on monitor 15. FIG. 9A illustrates the processing conditions setting screen targeting the entire store, and FIG. 9B illustrates the processing conditions setting screen targeting each sales floor.

In the present exemplary embodiment, processing conditions setter 39 performs a process of setting various types of processing conditions in response to an input operation of the user, and when the processing conditions setting process is performed, the processing conditions setting screens illustrated in FIG. 9A and FIG. 9B are displayed on monitor 15.

As illustrated in FIG. 9A, date display portion 61, date selecting portion 62, processing conditions input portion 63, and setting button 64 are provided on a store processing conditions setting screen. Date to be set is displayed on date display portion 61. The user selects date by using date selecting portion 62. If the user operates date selecting portion 62, a calendar screen is displayed; and if the date is selected on the calendar screen, the date is displayed on date display portion 61, and thus it is possible to input the processing condition of the date in processing conditions input portion 63.

Store gap threshold value entry field 65 and task check necessity selection field 66 are provided for each timeslot (timing) in processing conditions input portion 63. If setting button 64 is operated after a processing condition is input in processing conditions input portion 63, a setting process is performed by processing conditions setter 39.

The user inputs a numerical value which is a threshold value of a store gap (a difference between the number of entering customers and the number of paying customers in a store) in store gap threshold value entry field 65 for each timeslot. The threshold value is used in the store gap determination for obtaining the evaluation value for each timeslot in timeslot evaluator 51 (see FIG. 6), and the timeslots, for which timeslot evaluator 51 determines that attention is necessary, are displayed in a display form attracting attention from the viewer, on the store monitoring screen (see FIG. 10).

The user selects whether or not a task check is necessary in the store for each timeslot in task check necessity selection field 66. The task check is intended to check whether a sales clerk properly performs a predetermined task. Here, a timeslot for which the necessity of a task check is input is displayed in the form of attracting attention from the viewer, on the store monitoring screen (see FIG. 10 and the like).

As illustrated in FIG. 9B, date display portion 61, date selecting portion 62, sales floor selecting portion 67, processing conditions input portion 63, and setting button 64 are provided on the sales floor processing conditions setting screen. Date display portion 61, date selecting portion 62, and setting button 64 are the same in the store processing conditions setting screen illustrated in FIG. 9A. Sales floor selecting portion 67 is intended for the user to select a sales floor, and the user performs an operation for inputting the processing conditions for each sales floor in processing conditions input portion 63.

Sales floor gap threshold value entry field 68 and task check necessity selection field 69 are provided for each timeslot (timing), in processing conditions input portion 63.

The user inputs a numerical value which is a threshold value for a sales floor gap (a difference between the number of customers staying at a sales floor and the number of paying customers in a sales floor, or a difference between the number of entering customers and the number of customers staying at a sales floor) for each timeslot, in sales floor gap threshold value entry field 68. The threshold value is used in the sales floor gap determination for obtaining the evaluation value for each timeslot in timeslot evaluator 51 (see FIG. 7 and FIG. 8), and the timeslots for which timeslot evaluator 51 determines that attention is necessary are displayed in a display form of attracting attention from the viewer, on the sales floor monitoring screen (see FIG. 12).

The user selects whether or not a task check is necessary in the sales floor for each timeslot in task check necessity selection field 69. The task check is intended to check whether a sales clerk properly performs a predetermined task. Here, a timeslot for which the necessity of a task check is input is displayed in the form of attracting attention from the viewer, on the sales floor monitoring screen (see FIG. 12 and the like).

Here, a store gap (a difference between the number of entering customers and the number of paying customers in a store) indicates the opportunity loss status of the entire store, or a sales floor gap (a difference between the number of customers staying at a sales floor and the number of paying customers in a sales floor, or a difference between the number of entering customers and the number of customers staying at a sales floor) indicates the opportunity loss status of the sales floor, but the store gap or the sales floor gap depends on the state of a customer and the state of a customer varies depending on a timeslot, such that in the present exemplary embodiment, the threshold value is set for each timeslot. For example, a large number of customers may enter alone at night, and in this case, a difference between the number of entering customers and the number of paying customers in a store is reduced, such that the threshold value is set to be smaller than in daytime.

The task check is intended to check whether a sales clerk properly performs a predetermined task, and on the store processing conditions setting screen illustrated in FIG. 9A, for example, a task in a store needs to be checked in a timeslot of 11:00 before a peak time, and a task in a store needs to be checked in a timeslot of 12:00 at a peak time. On the sales floor processing conditions setting screen illustrated in FIG. 9B, a task for product disposal needs to be checked in the timeslot of 2:00, a task for a sales floor (product display) needs to be checked in the timeslot of 7:00, a task for a sales floor (product organization) needs to be checked in a timeslot of 11:00 before a peak time, and a task for a sales floor (product organization) needs to be checked in a timeslot of 12:00 at a peak time.

In the present exemplary embodiment, processing conditions, in other words, the threshold values for the store gap and the sales floor gap and the necessity for the task check are set for each day, and thus, it is possible to respond to an opening date, a particular campaign, or the like.

In the present exemplary embodiment, the processing conditions are set for each day, but the processing conditions may be set according to weekdays, weekends, or holidays. For example, since a large number of customers enter a store alone at weekdays, there is a tendency that a difference between the number of entering customers and the number of paying customers in a store is reduced. Meanwhile, at weekends, families are likely to enter together, and in this case, one person alone does not perform accounting, such that there is a tendency that a difference between the number of entering customers and the number of paying customers in a store is increased. To satisfy the trends in numbers of customers, the processing conditions may be set according to weekdays, weekends, and holidays.

In the present exemplary embodiment, the threshold values for the store gap and the sales floor gap are set for each timeslot, but a determination may be performed by using a single threshold value. In the present exemplary embodiment, the threshold values are set in response to the input operation of a user, but a determination may be performed by using a threshold value which is set in advance.

Figure 11:
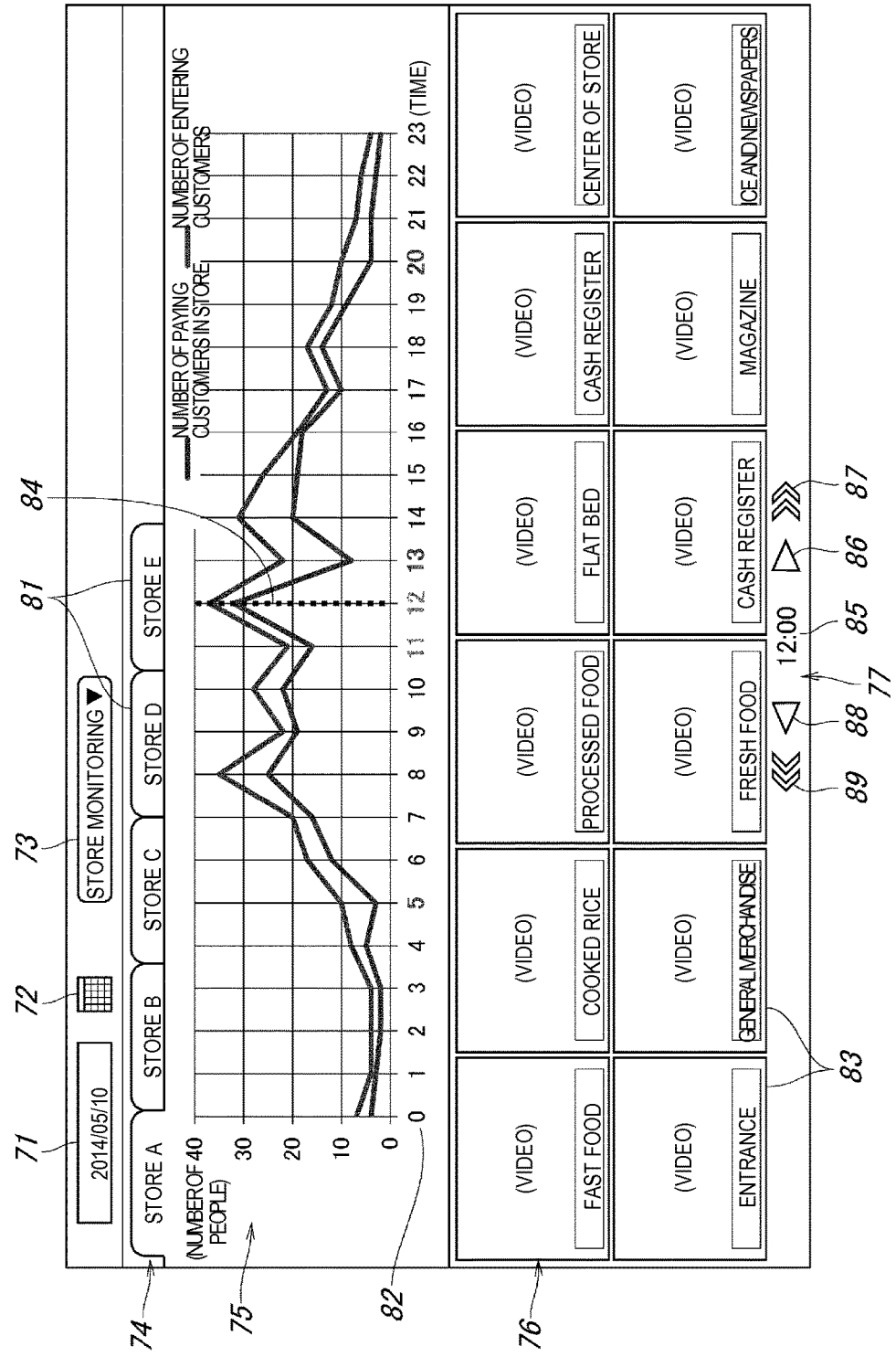
FIG. 11 is an explanatory diagram illustrating the store monitoring screen displayed on the monitor.

Next, the store monitoring screen that is displayed on monitor 15 in order for the user to understand the status of the opportunity loss of the store will be described. FIG. 10 and FIG. 11 are explanatory diagrams illustrating the store monitoring screen displayed on monitor 15. FIG. 10 displays the status of the corresponding day in real time, and FIG. 11 displays the status for a predetermined period of time in the past.

Date display portion 71, date selecting portion 72, display mode selecting portion 73, store selecting portion 74, statistical information display portion 75, video display portion 76, and video operating portion 77 are provided on the store monitoring screen.

In date display portion 71, a date is displayed, but in an initial state, the date of the day when the store monitoring screen is opened is displayed. A user selects a date in date selecting portion 72. If date selecting portion 72 is operated, a calendar screen is displayed. If date is selected on the calendar screen, the selected date is displayed on date display portion 71, and the statistical information and the video of the date is displayed in statistical information display portion 75 and video display portion 76.

The user selects a display mode in display mode selecting portion 73. In the present exemplary embodiment, it is possible to select any of store monitoring, sales floor monitoring, and trend analysis as the display mode. If the display mode of store monitoring is selected, the store monitoring screen illustrated in FIG. 10 and the like is displayed. If the display mode of sales floor monitoring is selected, a sales floor monitoring screen illustrated in FIG. 12 and the like is displayed. If the display mode of trend analysis is selected, a trend analysis screen illustrated in FIG. 16 and the like is displayed.

Tab 81 is provided for each store in store selecting portion 74, and if tab 81 is selected for operation, the statistical information and the video of the selected store are displayed in statistical information display portion 75 and video display portion 76.

The graphs of the number of entering customers and the number of paying customers in a store are displayed on statistical information display portion 75. In each of these graphs, a horizontal axis represents timeslots, and a vertical axis represents the number of people. In the present exemplary embodiment, statistical information generator 34 performs a process of generating statistical information from the measured values (the number of entering customers and number of paying customers in the store) which are obtained in measurer 33, display output controller 36 performs a process of generating a graph based on the statistical information generated in statistical information generator 34, and the graph is displayed on statistical information display portion 75.

Numbers 82 of timeslots (0:00 to 23:00) are displayed along the time axis, which is the horizontal axis of the graph, in statistical information display portion 75. Among numbers 82 of the timeslots, numbers 82 of timeslots for which timeslot evaluator 51 determines that attention is necessary in the entire store and numbers 82 of timeslots for which processing conditions setter 39 determines that task check is necessary in the entire store are displayed in a display format different from those of numbers 82 of other timeslots. In particular, in the examples illustrated in FIG. 10 and FIG. 11, the numbers 82 are highlighted by the colors thereof being changed.

Specifically, numbers 82 of timeslots for which it is determined that attention is necessary in the entire store are displayed in red. In the examples illustrated in FIG. 10 and FIG. 11, numbers 82 of respective timeslots of 5:00, 13:00, and 23:00 are displayed in red. Numbers 82 of timeslots for which it is determined that task check is necessary in the entire store are displayed in blue. In the examples illustrated in FIG. 10 and FIG. 11, numbers 82 of respective timeslots of 11:00 and 12:00 are displayed in blue. Numbers 82 of other timeslots are displayed in black.

The priorities of display colors of numbers 82 of timeslots are in the order of red, blue, and black, and the display color having a higher priority takes precedence. For example, if the timeslots for which it is determined that attention is necessary in the entire store and the timeslots for which it is set that task check is necessary in the entire store match, numbers 82 of the time slots are displayed in red.

The video of the inside of the store that is captured by camera 1 is displayed as a moving image on video display portion 76. In the present exemplary embodiment, sales floor video display portion 83 is provided for each sales floor in video display portion 76, and the name of a sales floor and the video of a sales floor are displayed on each sales floor video display portion 83. The video of sales floor video display portion 83 is displayed in response to an operation to select number (selection point) 82 of a timeslot of statistical information display portion 75, and if an operation (click) to select number 82 of a timeslot is performed, the video of each sales floor of the selected timeslot is displayed on sales floor video display portion 83. Line 84 representing a timing of a video is displayed on statistical information display portion 75.

When a moving image is displayed on sales floor video display portion 83, or a still image of a start timing of the selected timeslot is displayed in an initial state, if a user performs an operation (click) to select sales floor video display portion 83, the playback of the moving image may be started. A moving image may be played in sales floor video display portion 83, but a moving video playback screen may be displayed in a pop-up.

Videos of a four-split display mode, in other words, videos captured by cameras 1, which are omnidirectional cameras, are divided into four and four videos are displayed in video display portion 76. Videos of four areas which are set in advance are extracted, among videos of one camera 1 in the four-split display mode, an error correction is performed on the videos, and four obtained videos are respectively displayed on sales floor video display portion 83. In the examples illustrated in FIG. 10 and FIG. 11, each of the videos of three cameras 1 is divided into four videos, and these videos are displayed in a total of twelve sales floor video display portions 83.

Timing display portion 85, first and second skip buttons 86 and 87, and first and second reverse skip buttons 88 and 89 are provided in video operating portion 77. First and second skip buttons 86 and 87 have different skip intervals; for example, if first skip button 86 is operated, a video of 15 minutes later is displayed; and if second skip button 87 is operated, a video of one hour later is displayed. First and second reverse skip buttons 88 and 89 have different skip intervals; for example, if first reverse skip button 88 is operated, a video of 15 minutes before is displayed; and if second reverse skip button 89 is operated, a video of one hour before is displayed.

Figure 12:
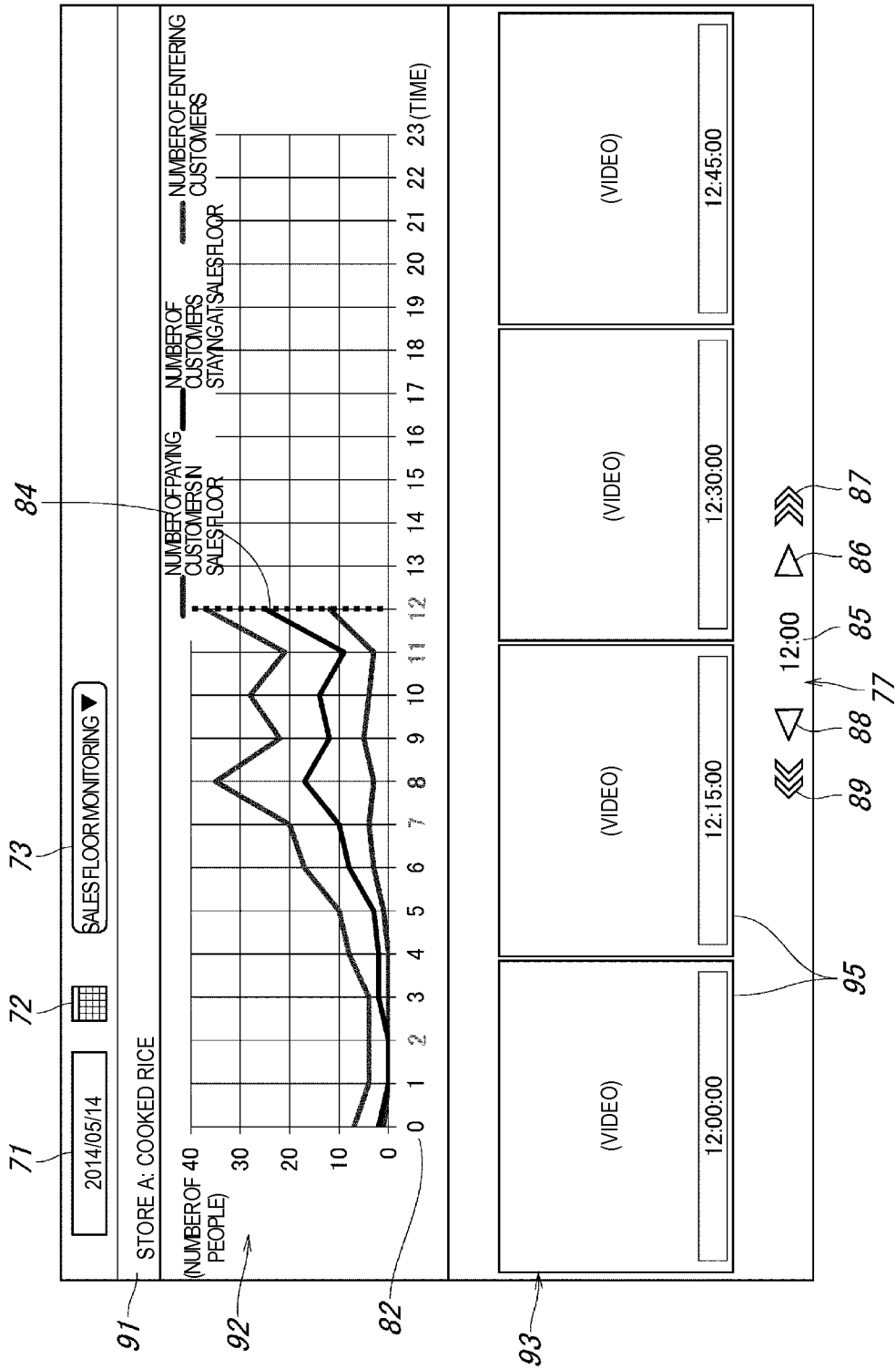
FIG. 12 is an explanatory diagram illustrating a sales floor monitoring screen displayed on the monitor.
Figure 13:
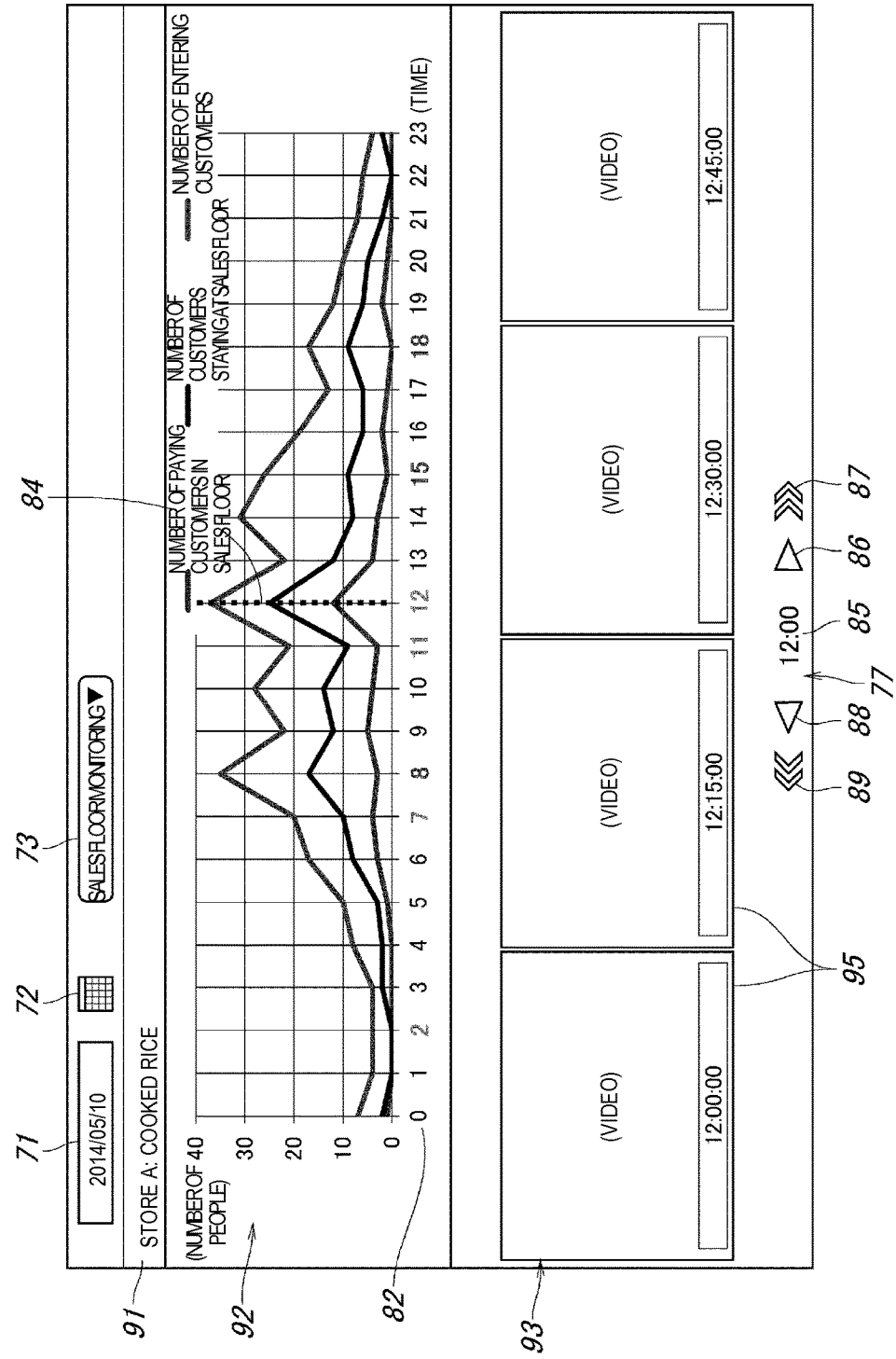
FIG. 13 is an explanatory diagram illustrating the sales floor monitoring screen displayed on the monitor.

Next, a sales floor monitoring screen displayed on monitor 15 in order for the user to understand the status of the opportunity loss in the sales floor will be described. FIG. 12 and FIG. 13 are explanatory diagrams illustrating the sales floor monitoring screens that are displayed on the monitor 15. FIG. 12 is intended to display the status of the corresponding day in real time, and FIG. 13 is intended to display the status for a predetermined period of time in the past.

Date display portion 71, date selecting portion 72, display mode selecting portion 73, store and sales floor display portion 91, statistical information display portion 92, video display portion 93, and video operating portion 77 are provided in the sales floor monitoring screen.

The sales floor monitoring screen can be displayed by selecting a sales floor monitoring display mode in display mode selecting portion 73, and the sales floor monitoring screen can be displayed while omitting a selection operation in display mode selecting portion 73, by selecting sales floor video display portion 83 in the store monitoring screen illustrated in FIG. 10 and FIG. 11.

Date display portion 71, date selecting portion 72, display mode selecting portion 73, and video operating portion 77 are the same as in the store monitoring screen illustrated in FIG. 10 and FIG. 11. Although the names of the selected store and sales floor are displayed in store and sales floor display portion 91, a sales floor list is displayed by click-operation of the name of this sales floor, and it is possible to select a sales floor that the user wants to display, in video display portion 93.

Respective graphs of the number of paying customers in a sales floor, the number of customers staying at a sales floor, and the number of entering customers are displayed in statistical information display portion 92. In each of these graphs, a horizontal axis represents timeslots, and a vertical axis represents the number of people. In the present exemplary embodiment, statistical information generator 34 performs a process of generating statistical information from the measured values (the number of paying customers in a sales floor, the number of customers staying at a sales floor, and the number of entering customers) which are obtained in measurer 33, display output controller 36 performs a process of generating a graph based on the statistical information generated in statistical information generator 34, and the graph is displayed on statistical information display portion 92.

Numbers 82 of timeslots (0:00 to 23:00) are displayed along the time axis which is the horizontal axis of the graph, in statistical information display portion 92. Among numbers 82 of timeslots, numbers 82 of timeslots for which timeslot evaluator 51 determines that attention is necessary in units of sales floors, and numbers 82 of timeslots for which processing conditions setter 39 determines that task check is necessary in units of sales floors are displayed in a display format different from numbers 82 of other timeslots. In particular, in the examples illustrated in FIG. 12 and FIG. 13, numbers 82 are highlighted by the colors thereof being changed.

Specifically, numbers 82 of the timeslots for which it is determined that attention is necessary in units of sales floors are displayed in red. In the examples illustrated in FIG. 12 and FIG. 13, numbers 82 of respective timeslots of 8:00, 15:00, and 18:00 are displayed in red. Numbers 82 of the timeslots for which it is set that task check is necessary in units of sales floors are displayed in blue. In the examples illustrated in FIG. 12 and FIG. 13, numbers 82 of respective timeslots of 2:00, 7:00, 11:00, and 12:00 are displayed in blue. Numbers 82 of other timeslots are displayed in black.

The priorities of display colors of numbers 82 of timeslots are in the order of red, blue, and black, and the display color having a higher priority takes precedence. For example, if the timeslots for which it is determined that attention is necessary in units of sales floors and the timeslots for which it is set that task check is necessary in units of sales floors match, numbers 82 of the timeslots are displayed in red.

The video of the sales floor that is captured by camera 1 is displayed in a moving image format on video display portion 93. A plurality of sales floor video display portions 95 of which each displays a video of a sales floor are provided in video display portion 93. A video at each of timings at predetermined intervals (for example, for 15 minutes) in one timeslot (for one hour) is displayed in a plurality of sales floor video display portions 95. The video of sales floor video display portion 95 is displayed in response to an operation of selecting number (selection point) 82 of a timeslot of statistical information display portion 92, and if the user performs an operation (click) of selecting number 82 of a time slot, the video of each timing of the selected timeslot is displayed in sales floor video display portion 95. Line 84 representing a timing of a video is displayed in statistical information display portion 92.

When a moving image is displayed in sales floor video display portion 95, or a still image of each timing of the selected timeslot is displayed in an initial state, if a user performs an operation (click) to select sales floor video display portion 95, the playback of the moving image may be started. A moving image may be played in sales floor video display portion 95, but a moving video playback screen may be displayed in a pop-up.

Figure 14:
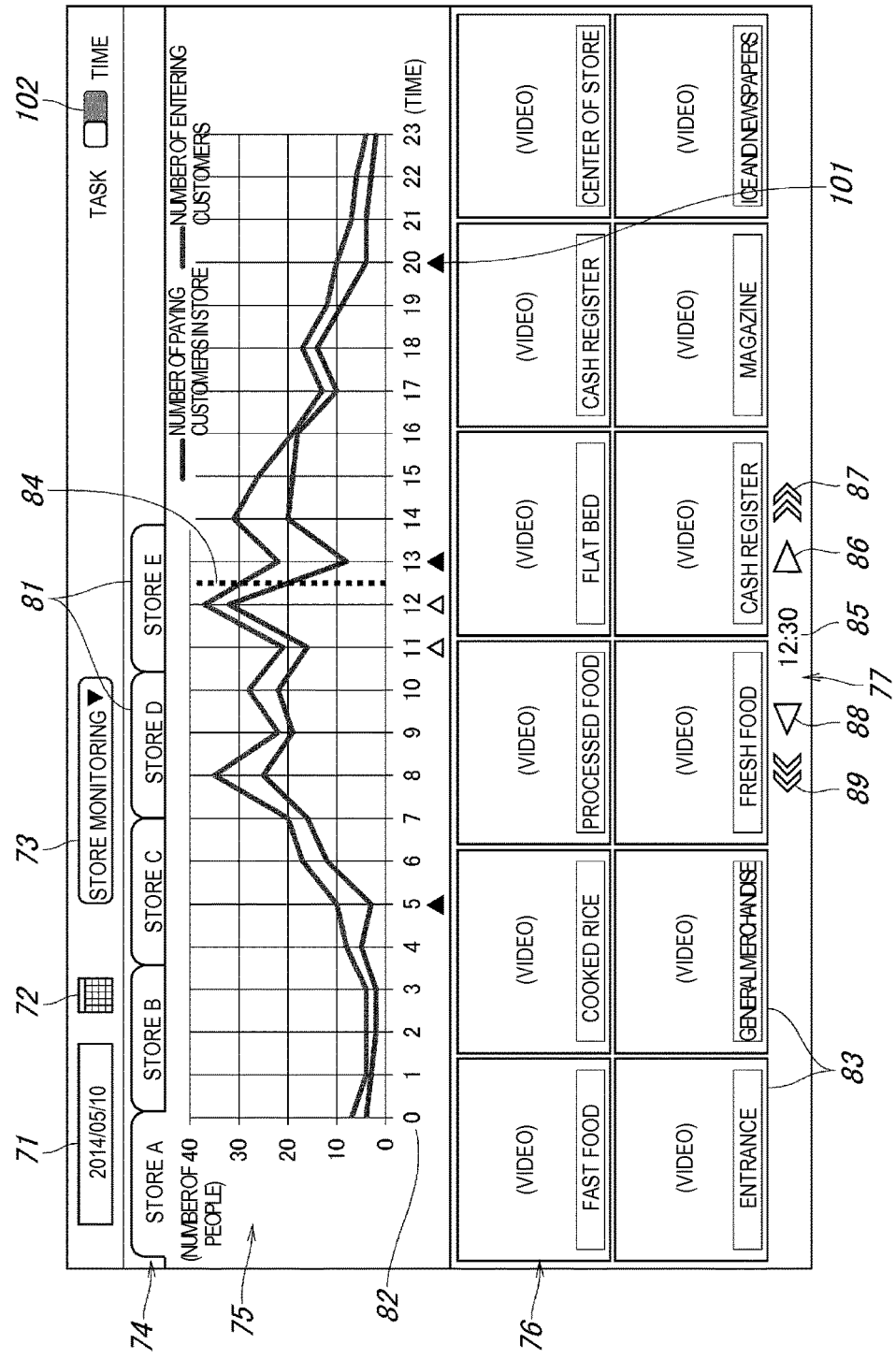
FIG. 14 is an explanatory diagram illustrating a modification example of the store monitoring screen displayed on the monitor.
Figure 15:
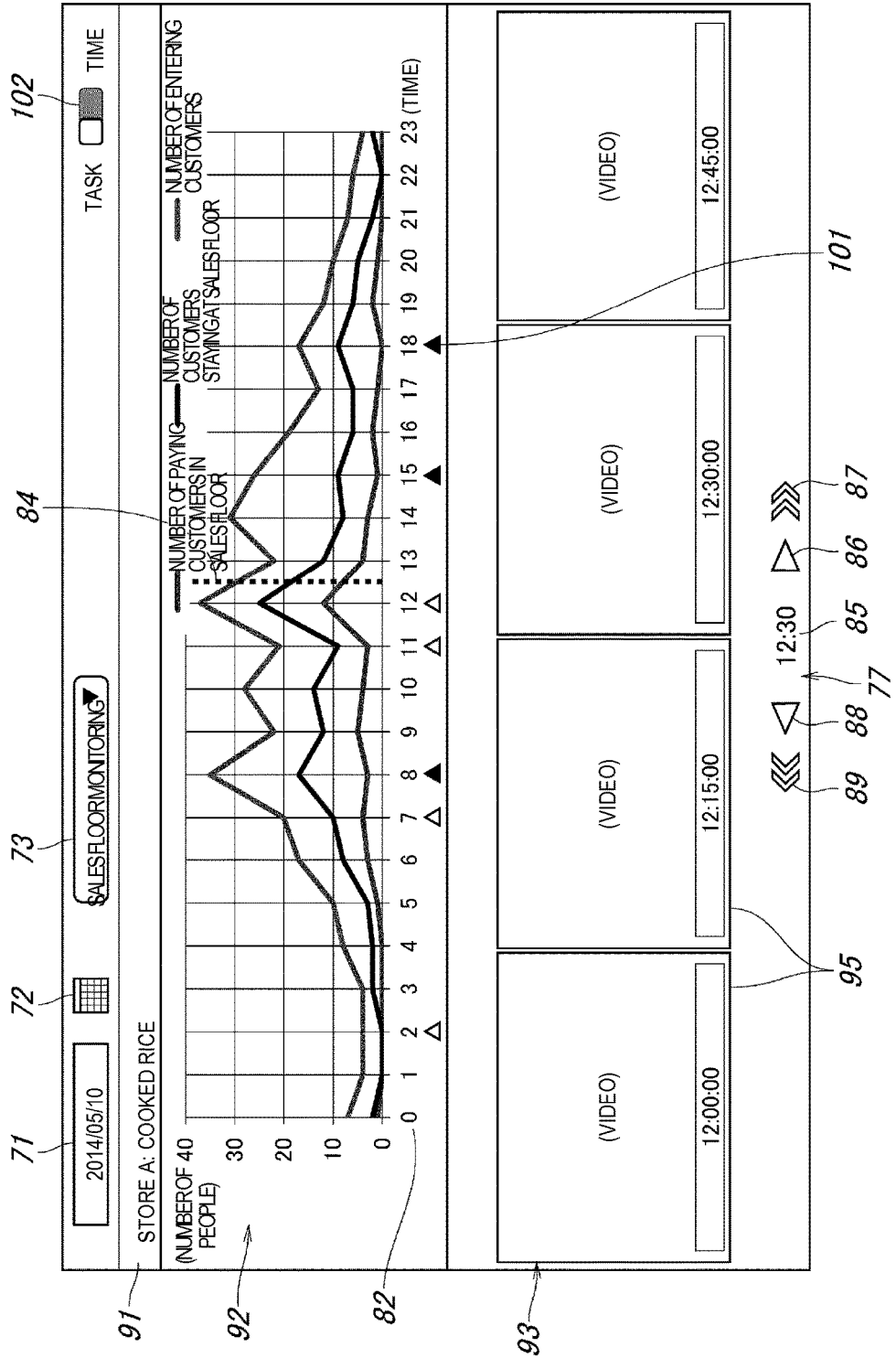
FIG. 15 is an explanatory diagram illustrating a modification example of the sales floor monitoring screen displayed on the monitor.

Next, a modification example of the store monitoring screen and the sales floor monitoring screen illustrated in shown in FIG. 10 to FIG. 13 will be described. FIG. 14 is an explanatory diagram illustrating the modification example of the store monitoring screen. FIG. 15 is an explanatory diagram illustrating the modification example of the sales floor monitoring screen.

In the store monitoring screen illustrated in FIG. 10 and FIG. 11, numbers 82 of timeslots for which timeslot evaluator 51 determines that attention is necessary in the entire store and numbers 82 of timeslots for which processing conditions setter 39 determines that task check is necessary in the entire store are highlighted by the colors thereof being changed to colors different from those of other timeslots, but in the store monitoring screen illustrated in FIG. 14, marks 101 are displayed in positions corresponding to the timeslots for which it is determined that attention is necessary in the entire store and the timeslots for which it is determined that task check is necessary in the entire store.

The display colors of marks 101 are different in the timeslots for which it is determined that attention is necessary in the entire store and the timeslots for which it is determined that task check is necessary in the entire store, and specifically, marks 101 of the timeslots for which it is determined that attention is necessary in the entire store are displayed in red, and marks 101 of the timeslots for which it is determined that task check is necessary in the entire store are displayed in blue.

In the sales floor monitoring screens illustrated in FIG. 12 and FIG. 13, numbers 82 of timeslots for which timeslot evaluator 51 determines that attention is necessary in units of sales floors, and numbers 82 of timeslots for which processing conditions setter 39 determines that task check is necessary in units of sales floors are highlighted by the colors thereof being changed to color different from those other timeslots. In the sales floor monitoring screen illustrated in FIG. 15, marks 101 are displayed at positions corresponding to the timeslots for which it is determined that attention is necessary in units of sales floors and the timeslots for which it is determined that task check is necessary in units of sales floors.

The display colors of marks 101 are different in the timeslots for which it is determined that attention is necessary in units of sales floors and the timeslots for which it is determined that task check is necessary in units of sales floors, and specifically, marks 101 of the timeslots for which it is determined that attention is necessary in units of sales floors are displayed in red, and marks 101 of the timeslots for which it is determined that task check is necessary in units of sales floors are displayed in blue.

Mark 101 is a selection point to select a timeslot of a video to be displayed in video display portion 76, in store monitoring screen illustrated in FIG. 14 and the sales floor monitoring screen illustrated in FIG. 15, and if mark 101 is selected, the videos of the timeslots corresponding to selected marks 101 are displayed in video display portions 76 and 93.

If mark 101 and number 82 of the timeslot are assumed as selection points to select timeslots of videos to be displayed in video display portion 76 and 93, and similarly to the examples illustrated in FIG. 10 to FIG. 13, if number 82 of the timeslot is operated, the video of the selected timeslot may be displayed. Thus, it is possible to display a video of a timeslot without mark 101.

Operation mode selecting portion 102 is provided in the store monitoring screen illustrated in FIG. 14 and the sales floor monitoring screen illustrated in FIG. 15. Operation mode selecting portion 102 is intended to switch the operation mode when the user operates skip buttons 86 to 89, and the user selects either a task mode or a timing mode.

In the case of the task mode, if the user operates first skip button 86, a video of one selection point later is displayed; and if the user operates first reverse skip button 88, a video of one selection point before is displayed. In the case of the timing mode, a normal skip operation is performed. In other words, if the user operates first and second skip buttons 86 and 87, a video of a predetermined skip interval later (for example, 15 minutes and one hour) is displayed; and if the user operates first and second reverse skip buttons 88 and 89, a video of a predetermined skip interval (for example, 15 minutes and one hour) before is displayed. In the examples illustrated in FIG. 14 and FIG. 15, a current display timing is 12:30, and if the user operates first skip button 86 in the task mode, a video of a selection point (disposal) of 13:00 is displayed; and if the user operates first skip button 86 in the timing mode, a video of 12:45 is displayed.

Figure 16:
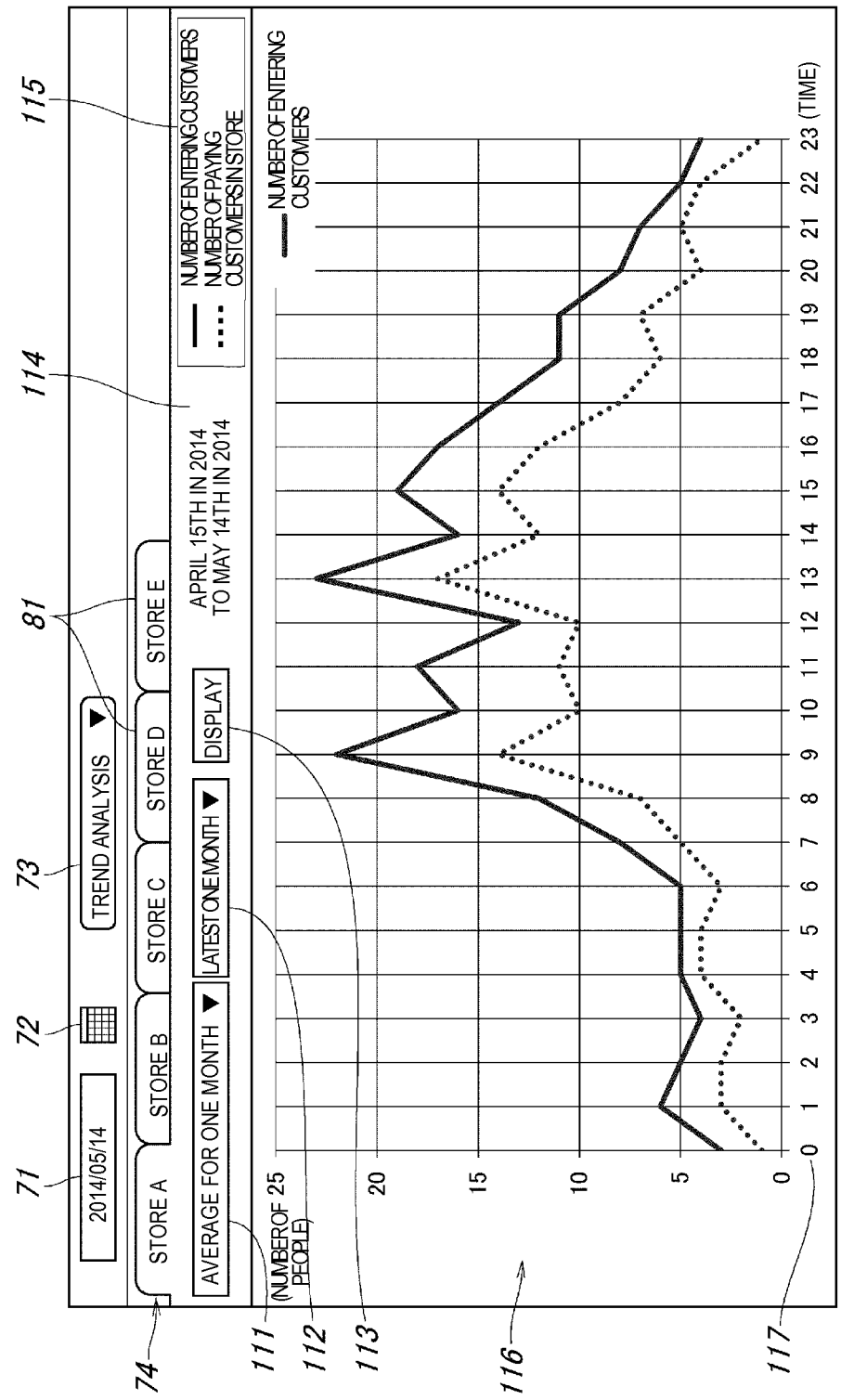
FIG. 16 is an explanatory diagram illustrating a trend analysis screen displayed on the monitor.
Figure 17:
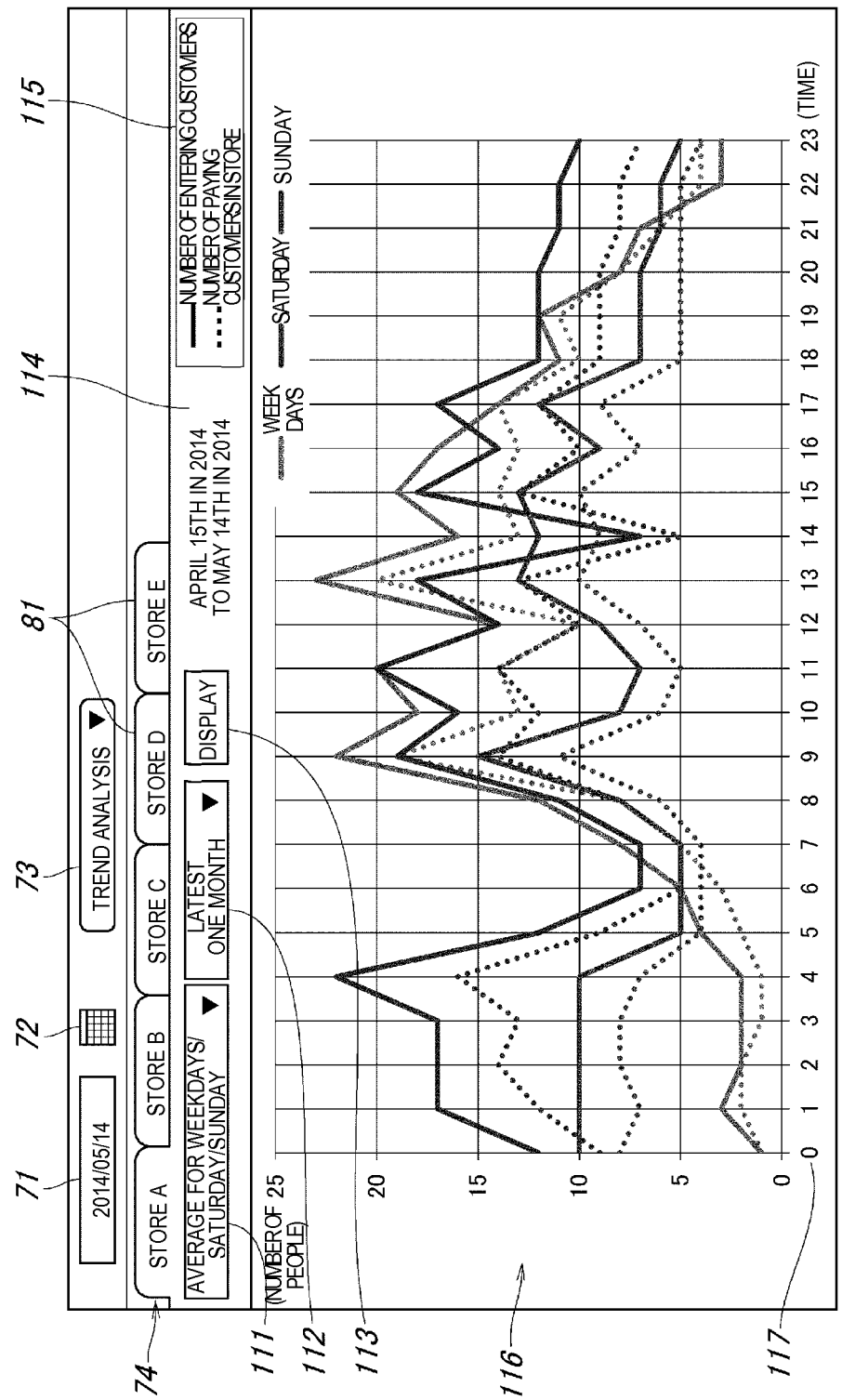
FIG. 17 is an explanatory diagram illustrating a trend analysis screen displayed on the monitor.
Figure 18:
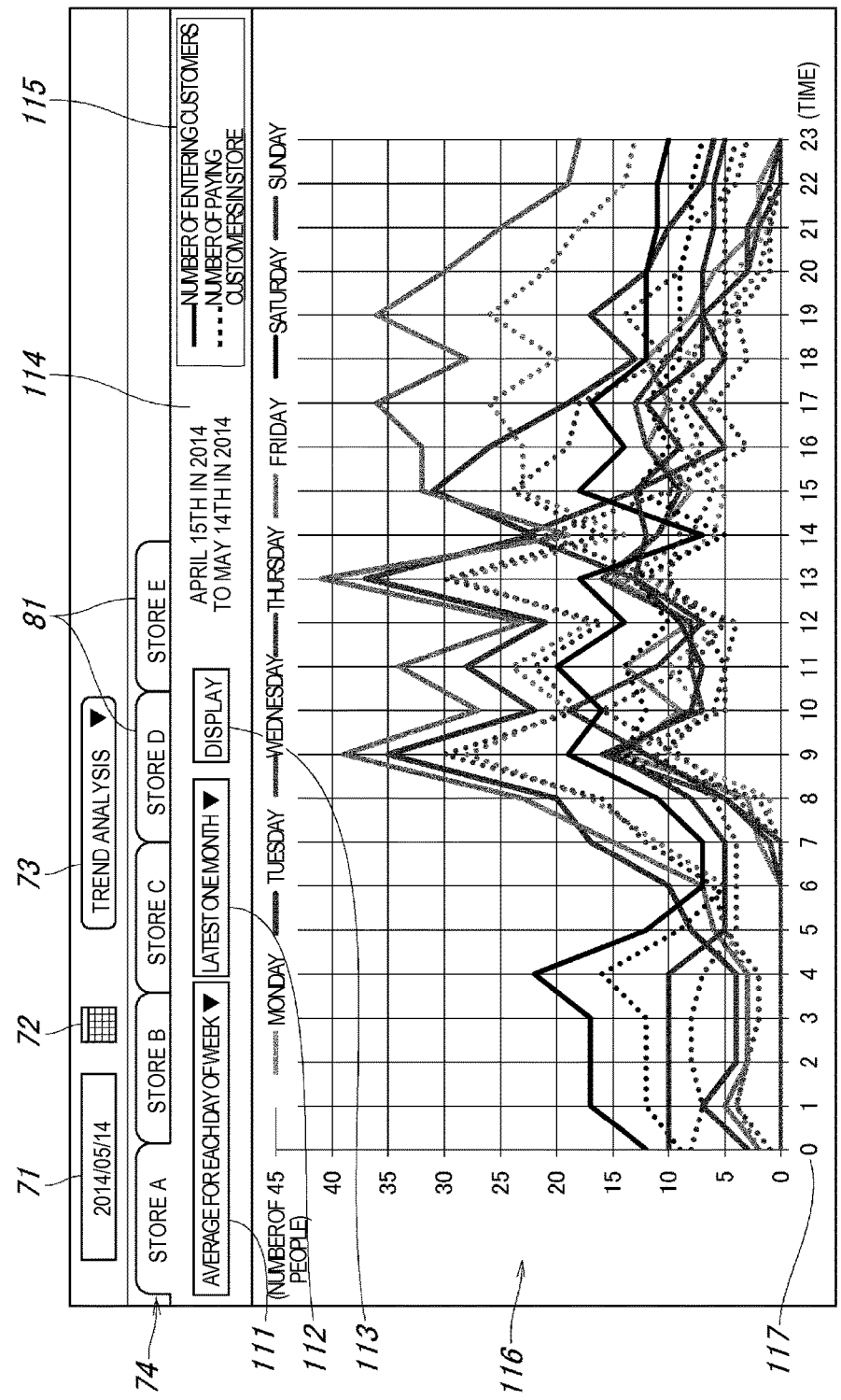
FIG. 18 is an explanatory diagram illustrating the trend analysis screen displayed on the monitor.

Next, a trend analysis screen displayed on monitor 15 illustrated in FIG. 4 will be described. FIG. 16, FIG. 17, and FIG. 18 are explanatory diagrams illustrating trend analysis screens displayed on monitor 15. FIG. 19 is an explanatory diagram illustrating a video display screen which is displayed when a timeslot is selected on the trend analysis screens illustrated in FIG. 16 to FIG. 18.

As illustrated in FIG. 16 to FIG. 18, date display portion 71, date selecting portion 72, display mode selecting portion 73, store selecting portion 74, aggregation mode selecting portion 111, aggregation period selecting portion 112, display button 113, aggregation period display portion 114, legend display portion 115, and statistical information display portion 116 are provided on the trend analysis screen.

Date display portion 71, date selecting portion 72, display mode selecting portion 73, and store selecting portion 74 are the same as in the monitoring screen illustrated in FIG. 10 and the like. A trend analysis screen is displayed on display mode selecting portion 73, by selecting the trend analysis.

The user selects an aggregation mode in aggregation mode selecting portion 111. In the present exemplary embodiment, there are an average for one month, an average for weekdays, Saturday, and Sunday, and an average for each day of the week, as the aggregation mode. The users selects an aggregation period in aggregation period selecting portion 112. In the present exemplary embodiment, it is possible to select a recent predetermined period of time (one week, one month, three months, six months, one year, and the like) as the aggregation period. If the user selects the aggregation mode and the aggregation period respectively in aggregation mode selecting portion 111 and aggregation period selecting portion 112, and operates display button 113, the aggregated statistical information is displayed in statistical information display portion 116 in the selected aggregation mode and for the aggregation period. Specific date of the aggregation period that is selected in aggregation period selecting portion 112 is displayed in aggregation period display portion 114. The example of a graph legend that is displayed in statistical information display portion 116 is displayed in legend display portion 115.

In the example illustrated in FIG. 16, the aggregation mode is set to the monthly average and the aggregation period is set to the latest one month. In this case, statistical information generator 34 performs a process of averaging the number of entering customers and the number of paying customers in a store for each timeslot of each day of the latest one month, and obtaining the average number of entering customers and the average number of paying customers in the store for each timeslot in one month; and the graphs of the average the number of entering customers and the average number of paying customers in the store of the latest one month are displayed in statistical information display portion 116.

In the example illustrated in FIG. 17, the aggregation mode is set to the average for weekdays, Saturday, and Sunday and the aggregation period is set to the latest one month. In this case, statistical information generator 34 performs a process of averaging the number of entering customers and the number of paying customers in a store for each timeslot of each day of the latest one month, for each of weekdays, Saturday, and Sunday, and obtaining the average the number of entering customers and the average number of paying customers in the store for each timeslot of weekdays, Saturday, and Sunday, and the graphs of the average the number of entering customers and the average number of paying customers in the store for weekdays, Saturday, and Sunday are displayed in statistical information display portion 116.

In the example illustrated in FIG. 18, the aggregation mode is set to the average for each day of the week and the aggregation period is set to the latest one month. In this case, statistical information generator 34 performs a process of averaging the number of entering customers and the number of paying customers in a store for each timeslot of each day of the latest one month, for each of weekdays, Saturday, and Sunday, and obtaining the average the number of entering customers and the average number of paying customers in the store for each timeslot of each day of the week, and the graphs of the average the number of entering customers and the average number of paying customers in the store for each day of the week are displayed in statistical information display portion 116.

In the trend analysis screen illustrated in FIG. 16 to FIG. 18, in the graph displayed in statistical information display portion 116, a horizontal axis represents timeslots and a vertical axis represents the number of people. Similarly to the monitoring screen illustrated in FIG. 10 and the like, numbers 117 of timeslots (0:00 to 23:00) are displayed along the time axis which is the horizontal axis of the graph, in statistical information display portion 116, and numbers 117 of timeslots for which it is determined that attention is necessary in the entire store and timeslots for which it is set that task check is necessary in the entire store are highlighted by the colors thereof being changed to colors different from those of other time slots.

In the trend analysis screen illustrated in FIG. 16 to FIG. 18, similarly to the monitoring screen illustrated in FIG. 10 and the like, number 117 of a timeslot is a selection point for selecting a timeslot of a video; and if number 117 of the timeslot is selected, a video display screen displayed in FIG. 19 is displayed in a pop-up. In the video display screen, a video of a sales floor of a timeslot selected on the time axis which is the horizontal axis of a graph is displayed, in a date displayed in date display portion 71 of the trend analysis screen.

Particularly, in the example shown in FIG. 19, a plurality of sales floor video display portions 121 which displays a video for each sales floor are provided in the video display screen. A video of each timing is displayed at a predetermined interval (for example, for 15 minutes) in the selected timeslot, in sales floor video display portion 121.

When a moving image is displayed in sales floor video display portion 121, or a still image of each timing of the selected timeslot is displayed in an initial state, if a user performs an operation (click) to select sales floor video display portion 121, the playback of the moving image may be started. A moving image may be played in sales floor video display portion 121, but a moving video playback screen may be displayed in a pop-up.

The trend analysis screens illustrated in FIG. 16 to FIG. 18 are for targeting the entire store, but a trend analysis screen with the same details targeting each sales floor can be displayed.

In the present exemplary embodiment, statistical information generator 34 forms a graph of values for each timeslot that are obtained by aggregating measured values (the number of entering customers, the number of customers staying at a sales floor, the number of paying customers in a store, and the number of paying customers in a sales floor) at every measurement period of time (for 15 minutes) obtained by measurer 33, in a timeslot, and displays the graph on the store monitoring screen, the sales floor monitoring screen, and the trend analysis screen, but the unit time period of aggregation may be one day, one week, one month, and the like. In this case, a selection point to select a timeslot of a video is set for each unit time period of aggregation; and for example, when displaying a graph representing a summary total for each day in one week, a number of a date or a mark corresponding thereto is a selection point.

As described above, in the present exemplary embodiment, first quantity obtainer 43 obtains a first quantity (for example, the number of entering customers) associated with a customer for whom purchase of products is expected, in other words, a customer who enters a store, second quantity obtainer 44 obtains a second quantity (for example, a number of paying customers in the store) associated with a customer who has actually purchased products in the store, video obtainer 38 obtains a captured video of an inside of a store, statistical information generator 34 generates statistical information indicating temporal change in status of the first quantity and the second quantity, display output controller 36 integrates and displays the statistical information and the video of the inside of the store, in other words, outputs display information for displaying the statistical information and the video of the inside of the store on one screen, to a display device, in particular, display output controller 36 displays the statistical information along the time axis, and displays a selection point on the time axis, and the video of the inside of the store at the selected selection point, in response to a user's operation to select the selection point. Thus, since the statistical information is displayed, the user can understand the status of the opportunity loss in the store. Thus, since the video of the inside of the store is displayed, it is possible for the user to check the status of the opportunity loss in detail. The video of the selection point that is considered to be a problem based on the statistical information is quickly displayed, and thus it is possible to check the status of opportunity loss while comparing the statistical information with the video. Therefore, the user properly and quickly understands the status of the opportunity loss in the store, and thus it is possible to efficiently perform a task of considering an improvement to reduce the opportunity loss.

In the present exemplary embodiment, processing conditions setter (individual area setter) 39 sets a plurality of sales floors (individual areas) within a store, first quantity obtainer 43 obtains a first quantity targeting the entire store (for example, the number of entering customers), second quantity obtainer 44 obtains a second quantity targeting the entire store (for example, the number of paying customers in a store), video obtainer 38 obtains respective captured videos of a plurality of sales floors, statistical information generator 34 generates statistical information targeting the entire store, and display output controller 36 integrates and displays the statistical information targeting the entire store and a video for each of a plurality of sales floors (individual areas), such that the user can understand the status of the opportunity loss of the entire store, by the statistical information targeting the entire store, and since a video for each sales floor at the selection point in each of the entire store which is considered to have a problem is displayed, the user can check the status of the opportunity loss in detail and specifically.

In the present exemplary embodiment, processing conditions setter (individual area setter) 39 sets a plurality of sales floors (individual areas) within a store, first quantity obtainer 43 obtains a first quantity targeting each of a plurality of sales floors (individual areas), second quantity obtainer 44 obtains a second quantity targeting each of a plurality of sales floors (individual areas), video obtainer 38 obtains respective captured videos of a plurality of sales floors, statistical information generator 34 generates statistical information targeting each of a plurality of sales floors, and display output controller 36 integrates and displays the statistical information targeting one of a plurality of sales floors and a video for a sales floor corresponding thereto, and displays videos at a plurality of timings corresponding to the selected selection point, in response to a user's operation to select a selection point. Thus, since the statistical information of a sales floor and videos at a plurality of timings corresponding to the selection points are displayed, it is possible for the user to efficiently perform a task of checking the status of the opportunity loss in a sales floor in detail.

In the present exemplary embodiment, timeslot evaluator 51 evaluates necessity for attention for each timeslot, based on the first quantity and the second quantity, and determines an attention timeslot, and display output controller 36 displays a selection point corresponding to an attention timeslot, in a display format different from a selection point which does not correspond to an attention timeslot. Thus, the video of the attention timeslot is displayed quickly, and it is possible for the user to efficiently perform a task of specifically checking the status of the opportunity loss by a video.

In the present exemplary embodiment, since timeslot evaluator 51 evaluates necessity for attention targeting the entire store at each timeslot, based on a difference between the number of customers who enter the store (the number of entering customers) and the number of customers who actually purchase products in the store (number of paying customers in the store), it is possible to evaluate necessity for attention targeting the entire store at each time slot.

In the present exemplary embodiment, since timeslot evaluator 51 evaluates necessity for attention targeting a sales floor at each timeslot, based on a difference between the number of people staying at a sales floor (individual area) (the number of customers staying at a sales floor) and the number of customers who actually purchase products in the sales floor (the number of paying customers in a sales floor), or a difference between the number of customers who enter the store (the number of entering customers) and the number of customer staying at a sales floor (the number of customers staying at a sales floor), it is possible to evaluate necessity for attention targeting each sales floor at each timeslot.

In the present exemplary embodiment, since statistical information generator 34 generates statistical information in which a summary total of the first quantity and the second quantity for each timeslot (for example, one hour) is arranged in time series, and generates statistical information in which a summary total for each predetermined unit time period (for example, one day) that is longer than the timeslot is arranged in time series, and display output controller 36 displays the statistical information regarding the summary total for each unit time period, it is possible for the user to understand the status of the opportunity loss in the store, in the unit time period that is longer than the timeslot, and it is possible for the user to understand the transition trend of the status of the opportunity loss over a long period of time.

In the present exemplary embodiment, since display output controller 36 displays the statistical information regarding the summary total for each unit time period (for example, one day) along the time axis, displays a selection point on the time axis, and displays the video of the inside of the store corresponding to the selected selection point, in response to the user's operation to select the selection point, the video of the inside of the store of the selection point that is considered to be a problem based on the statistical information is quickly displayed, and thus it is possible for the user to properly and quickly understand the status of the opportunity loss in a store.

Second Exemplary Embodiment

Next, a second exemplary embodiment will be described. Those which are not specifically mentioned are the same as in the first exemplary embodiment.

Figure 20:
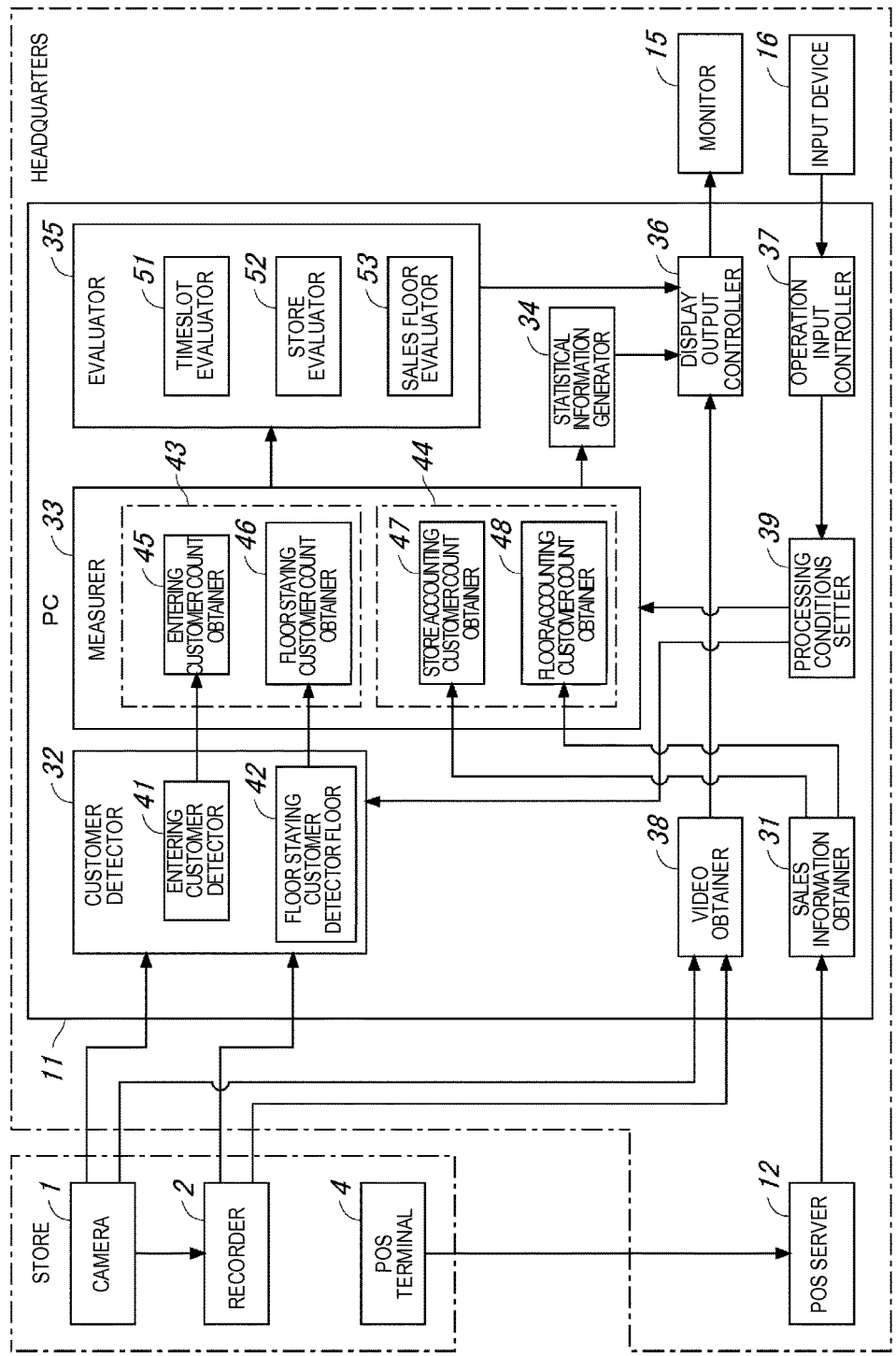
FIG. 20 is a functional block diagram illustrating a schematic configuration of a PC according to a second exemplary embodiment.

A facility management support process which is performed by PC 11 according to the second exemplary embodiment will be described. FIG. 20 is a functional block diagram illustrating a schematic configuration of PC 11 according to the second exemplary embodiment.

In the second exemplary embodiment, evaluator 35 further includes store evaluator (facility evaluator) 52, and sales floor evaluator (individual area evaluator) 53, in addition to timeslot evaluator 51.

Store evaluator 52 performs a process of evaluating a necessity for attention for each store, based on the measured values (the number of entering customers, the number of customers staying at a sales floor, the number of paying customers in a store, and the number of paying customers in a sales floor) which are obtained by measurer 33, and giving a priority to each store in a descending order of necessity for attention. In this process, the evaluation value targeting the entire store is obtained for each store, and the priority of each store is determined based on the evaluation value.

In the present exemplary embodiment, a store gap (a difference between the number of entering customers and the number of paying customers in a store) is calculated as the evaluation value regarding the entire store, and a priority is given in a descending order of the store gap. Since the store gap represents the status of products purchase by entering customers in the entire store, in other words, how many customers who have purchased products among customers visiting the store, and reflects a degree of opportunity loss in the store, it is possible to evaluate the degree of necessity for attention for each store, from the store gap. In other words, if the store gap is great, the products purchase rate is low in the entire store, the store is in a state where even if customers enter the store, the customers do not purchase many products, and thus it is possible to determine that the necessity for attention is high.

There are various methods as follows for calculating the store gap.

First, the sum of the number of entering customers and the number of paying customers in a store for one day (0:00:00 to 23:59:59) is calculated from the measured values (the number of entering customers and the number of paying customers in a store) obtained by measurer 33, and the store gap is calculated from the sum of the number of entering customers and the number of paying customers in a store. The time average value of the number of entering customers and the number of paying customers in a store is calculated by dividing the sum of the number of entering customers and the number of paying customers in a store for one day by the number of business hours (in the case of all day "24"), and the store gap is calculated from the time average value of the number of entering customers and the number of paying customers in a store.

The number of entering customers and the number of paying customers in a store of a timeslot are calculated from the measured value of a predetermined timeslot, for example, a peak timeslot, in other words, a busy timeslot when there are a large number of entering customers, among the measured values obtained by measurer 33, and a store gap is calculated from the number of entering customers and the number of paying customers in a store. In the store, two timeslots of morning (8:00 to 8:59) and noon (12:00 to 12:59) are peak times, and the measured values in these two timeslots may be used. Only the measured value of the peak timeslot in the morning, only the measured value of the peak timeslot at noon, or both the measured values of the peak timeslots in the morning and at noon may be used.

In order to raise the sales in the entire store, the store gap may be calculated from the measured value of the timeslots other than the peak timeslot, in other words, a quiet timeslot when the number of entering customers is less.

Store evaluator 52 obtains an evaluation value targeting a predetermined important sales floor for each store, and determines the priority of each store, based on the evaluation value. Since the important sales floor has a great impact on the sales of the store, it is possible to determine the degree of the necessity for attention of each store from the evaluation value targeting the important sales floor. Here, the important sales floor is the sales floor that most contributes to the sales of the store, and in the case of the convenience stores, usually, the important sales floor is a sales floor of cooked rice such as lunch boxes.

In the present exemplary embodiment, as the evaluation value regarding the important sales floor, a sales floor gap (a difference between the number of entering customers and the number of customers staying at the important sales floor) is calculated, and the priority is given in a descending order of the sales floor gap. The sales floor gap represents the degree to which customers stop by at the important sales floor, in other words, how many customers stop by at the important sales floor out of customers who enter the store, and reflects a degree of opportunity loss in the important sales floor, such that it is possible to evaluate the degree of necessity for attention to each store, from the sales floor gap. In other words, if the sales floor gap is great, the stop-by rate of the important sales floor is low, the store is in a state where many customers do not stop by at the important sales floor, and thus it is possible to determine that the necessity for attention is high.

As the evaluation value regarding the important sales floor, the sales floor gap (a difference between the number of customers staying at the important sales floor and the number of paying customers in a sales floor) is calculated, and priority is given in a descending order of sales floor gap. The sales floor gap represents a status of products purchase by customers in the important sales floor, in other words, how many customers who purchase products in the important sales floor among the customers who stop by at the important sales floor, and reflects a degree of opportunity loss in the important sales floor, such that it is possible to evaluate the degree of necessity for attention for each store, from the sales floor gap. In other words, if the sales floor gap is great, the products purchase rate in the important sales floor is low, the store is in a state where the customers do not purchase many products in the important sales floor, and thus it is possible to determine that the necessity for attention is high.

Sales floor evaluator 53 performs a process of evaluating the necessity for attention for each sales floor, based on the measured values (the number of entering customers, the number of customers staying at a sales floor, the number of paying customers in a store, and the number of paying customers in a sales floor) which are obtained by measurer 33, determining an attention sales floor, and giving the priority to the sales floor in a descending order of the necessity for attention. In the process, the evaluation value targeting each sales floor is obtained, attention sales floors are determined based on the evaluation value, and the priority of each sales floor is determined.

In the present exemplary embodiment, a sales floor gap (a difference between the number of entering customers and the number of customers staying at a sales floor) is calculated as the evaluation value regarding the sales floor, and priority is given in a descending order of the sales floor gap. The sales floor gap represents the degree to which customers stop by each sales floor, in other words, how many customers stop by at each sales floor among the entering customers, and reflects a degree of opportunity loss in each sales floor, such that it is possible to evaluate the degree of necessity for attention for each sales floor, from the sales floor gap. In other words, if the sales floor gap is great, the stop-by rate for the sales floor is low, the store is in a state where many customers do not stop by at the sales floor, and thus it is possible to determine that the necessity for attention is high.

A sales floor gap (a difference between the number of customers staying at a sales floor and the number of paying customers in a sales floor) is calculated as the evaluation value regarding the sales floor, and priority is given in a descending order of the sales floor gap. The sales floor gap represents a status of products purchase by customers in each sales floor, in other words, how many customers purchase products in the sales floor among the customers who stop by at each sales floor, and reflects a degree of opportunity loss in each sales floor, such that it is possible to evaluate the degree of necessity for attention for each sales floor, from the sales floor gap. In other words, if the sales floor gap is great, the products purchase rate in the sales floor is low, the store is in a state where the customers do not purchase many products in the sales floor, and thus it is possible to determine that the necessity for attention is high.

For the calculation of the sales floor gap, similarly to the case of the evaluation value (store gap) of the entire store, the total value or the average value of one day is calculated from the measured values (the number of entering customers, the number of customers staying at a sales floor, and the number of paying customers in a sales floor) measured in measurer 33, the sales floor gap is calculated from the total value and average value, and the sales floor gap may be calculated from the measured value of the peak timeslot and the measured values of timeslots excluding the peak timeslot.

Figure 21:
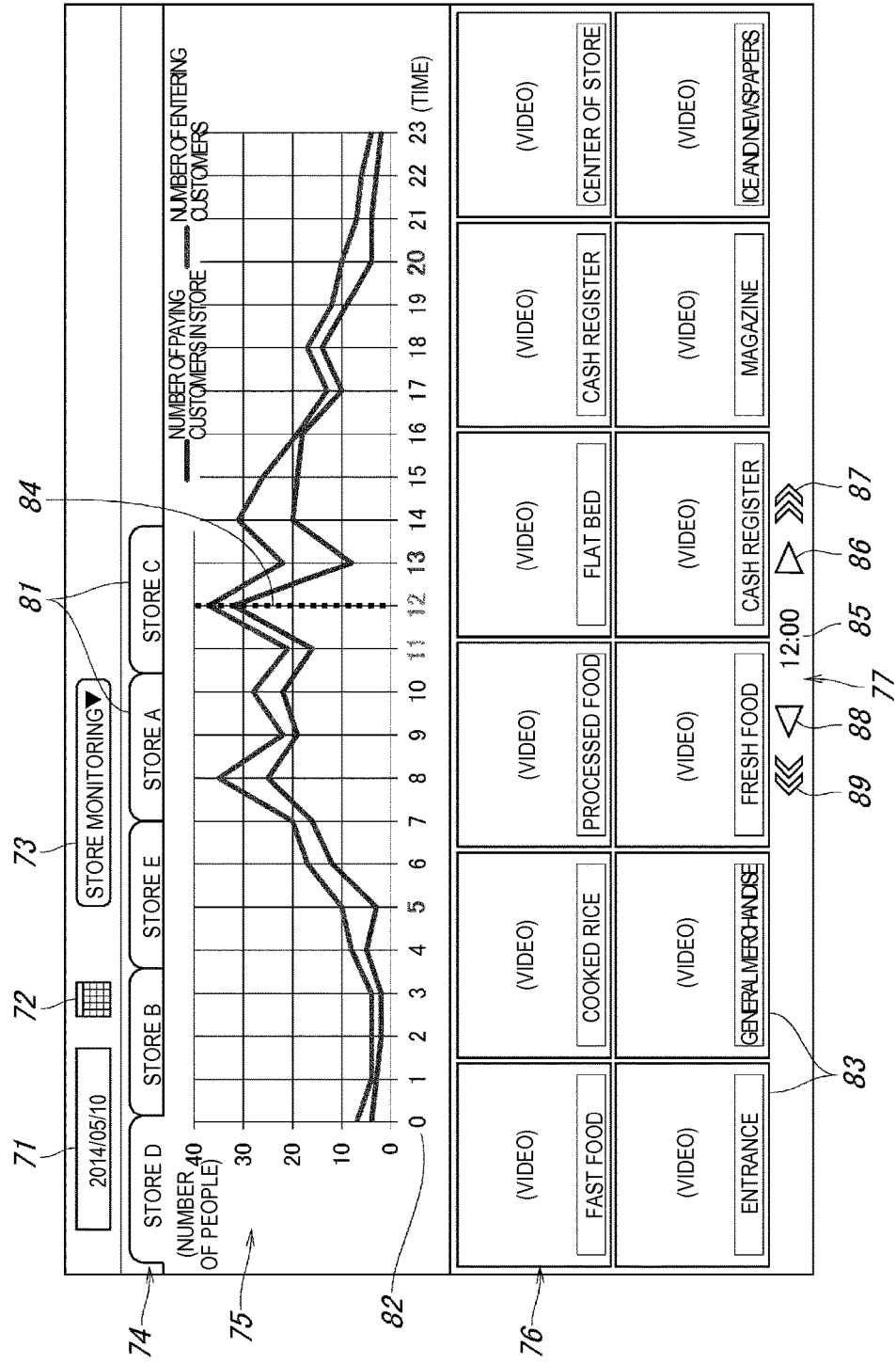
FIG. 21 is an explanatory diagram illustrating a store monitoring screen displayed on the monitor.
Figure 22:
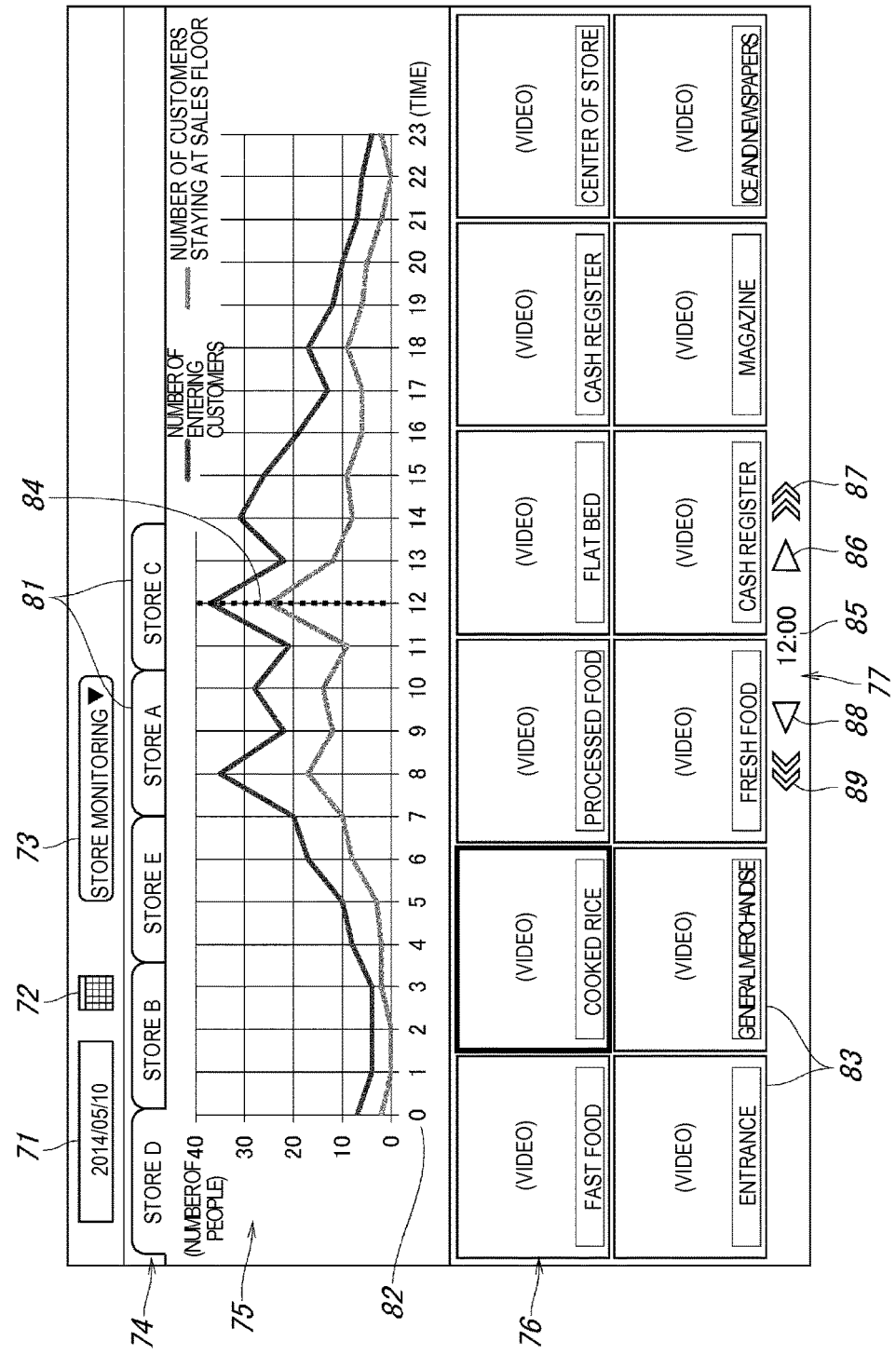
FIG. 22 is an explanatory diagram illustrating the store monitoring screen displayed on the monitor.
Figure 23:
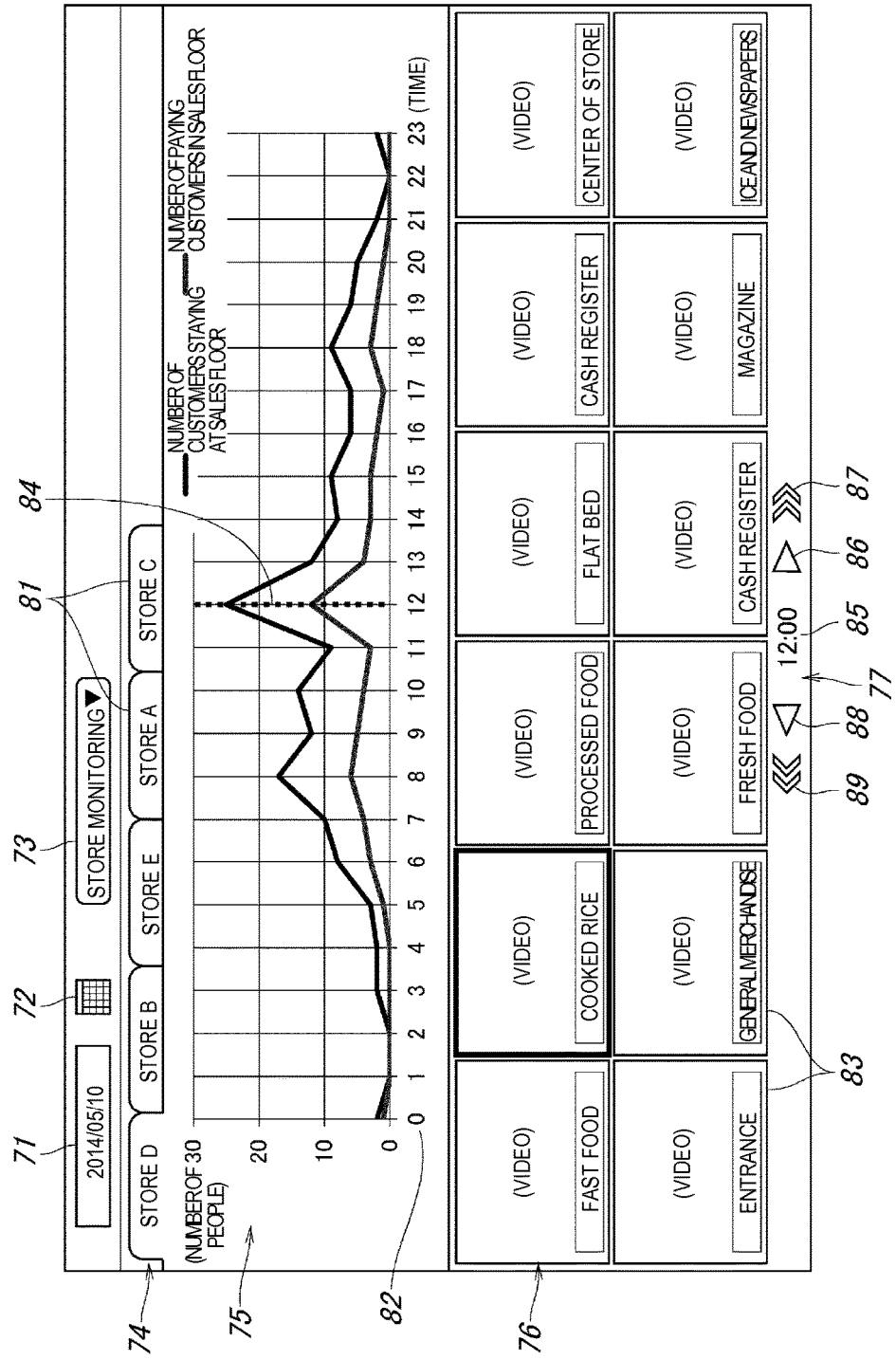
FIG. 23 is an explanatory diagram illustrating the store monitoring screen displayed on the monitor.
Figure 24:
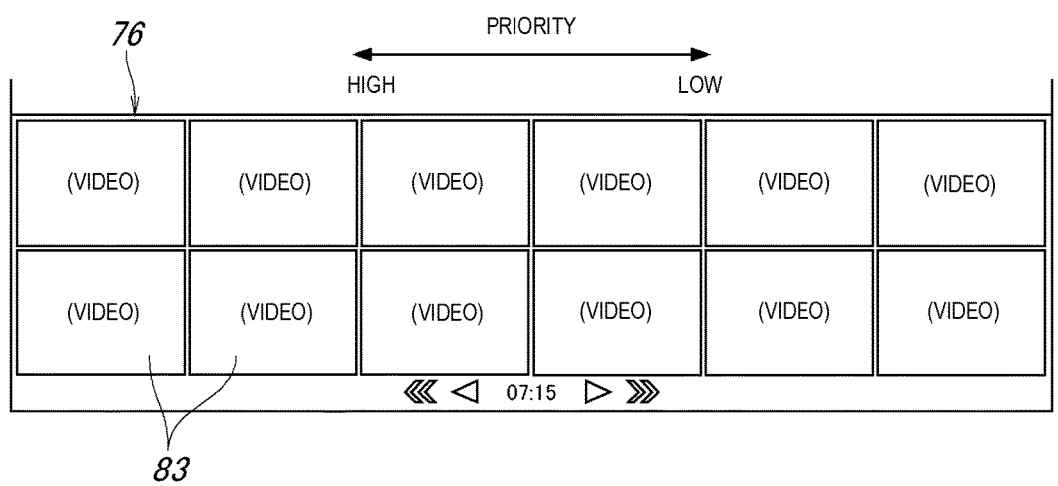
FIG. 24 is an explanatory diagram illustrating a modification example of a video display portion on the store monitoring screen displayed on the monitor.

Next, store monitoring screens displayed on monitor 15 will be described. FIG. 21, FIG. 22, and FIG. 23 are explanatory diagrams illustrating the store monitoring screens displayed on monitor 15. FIG. 24 is an explanatory diagram illustrating a modification example of the monitoring screen.

In the present exemplary embodiment, store evaluator 52 performs a process of giving a priority to each store in a descending order of a necessity for attention, display output controller 36 performs a process of arranging and displaying choices of a plurality of stores, according to the priority of each store, and thus the monitoring screens illustrated in FIG. 21 to FIG. 23 are displayed on monitor 15.

As illustrated in FIG. 21 to FIG. 23, store selecting portion 74 is provided on the store monitoring screen, and tabs (choices of stores) 81 are provided for respective stores, in store selecting portion 74. Tabs 81 for the respective stores are arranged and displayed according to the priority of each store, in other words, in a descending order of the necessity for attention from the left. Accordingly, tab 81 of the store having the highest necessity for attention is displayed on the left end.

Here, the store monitoring screen illustrated in FIG. 21 illustrates the case where the priority of each store is determined, with a store gap (a difference between the number of entering customers and the number of paying customers in a store) as an evaluation value, and the graph of the number of entering customers and the graph of the number of paying customers in a store are displayed on statistical information display portion 75.

The store monitoring screen illustrated in FIG. 22 illustrates the case where the priority of each store is determined, with a sales floor gap (a difference between the number of entering customers and the number of customers staying at the important sales floor) as an evaluation value, and the graph of the number of entering customers and the graph of the number of customers staying at the important sales floor are displayed on statistical information display portion 75.

The store monitoring screen illustrated in FIG. 23 illustrates the case where the priority of each store is determined, with a sales floor gap (a difference between the number of customers staying at the important sales floor and the number of paying customers in a sales floor) as an evaluation value, and the graph of the number of customers staying at the important sales floor and the graph of the number of paying customers in a sales floor are displayed on statistical information display portion 75.

In the present exemplary embodiment, sales floor evaluator 53 performs a process of evaluating a necessity for attention for each sales floor, and determining a sales floor which needs attention, and display output controller 36 performs a process of highlighting the sales floor which needs attention. In the examples illustrated in FIG. 22 and FIG. 23, a red thick frame is displayed on sales floor video display portion 83 of the sales floor which needs attention.

In the present exemplary embodiment, the outer frame of sales floor video display portion 83 of the sales floor which needs attention is highlighted, but various display modes are possible for highlighting of the sales floor which needs attention, for example, a mark or a number indicating that a sales floor is a sales floor which needs attention may be displayed in the vicinity of sales floor video display portion 83.

In the present exemplary embodiment, sales floor evaluator 53 performs a process of evaluating the necessity for attention for each sales floor, and giving the priority to sales floors in a descending order of the necessity for attention, and display output controller 36 performs a process of arranging and displaying videos of sales floors in a descending order of priority. Thus, the store monitoring screen illustrated in FIG. 24 is displayed on monitor 15. In the example illustrated in FIG. 24, the videos of sales floors are displayed in a descending order of a priority from the left, in sales floor video display portion 83.

Figure 25A:
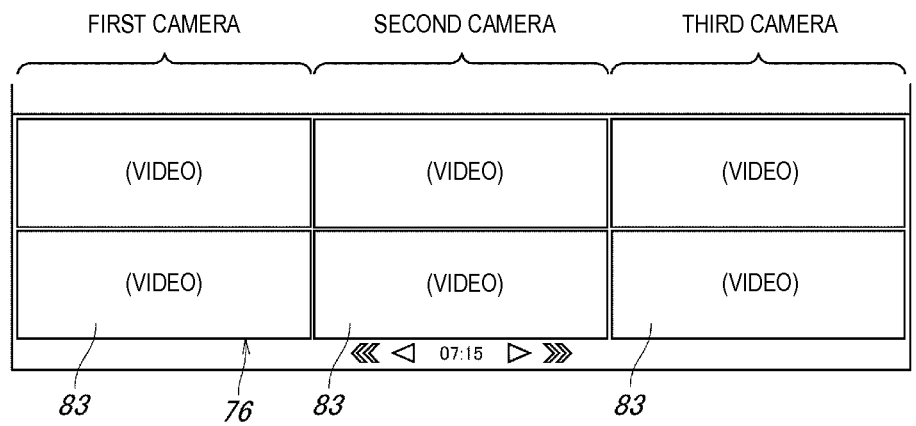
FIG. 25A is an explanatory diagram illustrating a modification example of the video display portion on the store monitoring screen displayed on the monitor.
Figure 25B:
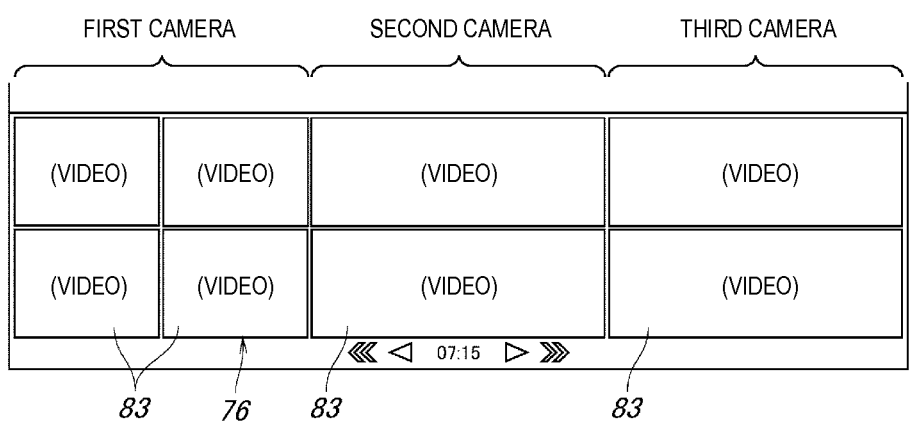
FIG. 25B is an explanatory diagram illustrating a modification example of the video display portion on the store monitoring screen displayed on the monitor.
Figure 25C:
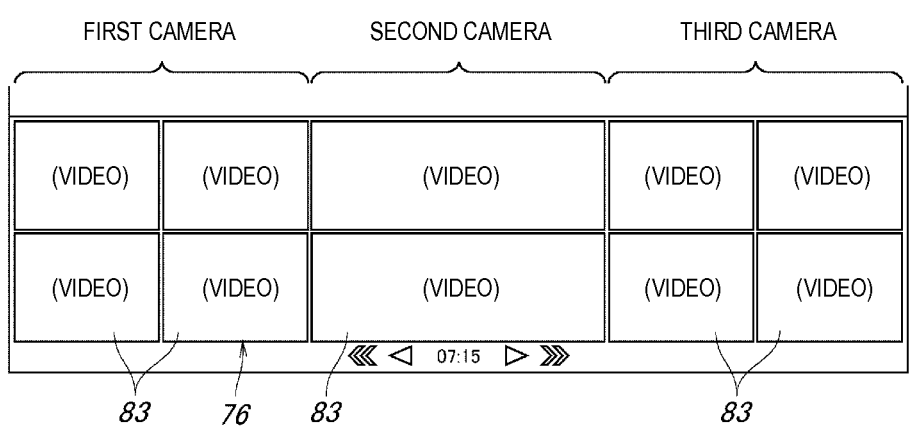
FIG. 25C is an explanatory diagram illustrating a modification example of the video display portion on the store monitoring screen displayed on the monitor.

Next, a modification example of video display portion 76 on the store monitoring screen illustrated in FIG. 10 will be described. FIG. 25A, FIG. 25B, and FIG. 25C are explanatory diagrams illustrating modification examples of video display portion 76 on the store monitoring screen.

In video display portion 76 on the monitoring screen illustrated in FIG. 10 and the like, videos are displayed in a four-split display mode, in other words, the video which is captured by camera 1 which is an omnidirectional camera is displayed while being split into four videos, and four sales floor video display portions 83 are provided for each camera 1; and as illustrated in FIG. 25A, videos are displayed in a two-split display mode, in other words, the video captured by camera 1 is split into two videos, two panoramically developed videos are displayed, and two sales floor video display portions 83 may be provided for each camera 1.

In the example illustrated in FIG. 25A, all of videos of three cameras are displayed in a two-split display mode, but as illustrated in FIGS. 25B and C, the videos may be displayed in combination of a four-split display mode and a two-split display mode. With respect to the combination in which the video of each camera is displayed in any of the four-split display mode and the two-split display mode, various combinations may be possible in addition to the illustrated combination.

In the present exemplary embodiment, as illustrated in FIG. 2A, an example of a video in the case where camera 1 is an omnidirectional camera is illustrated, but as illustrated in FIG. 2B, it is also possible to employ a box camera for camera 1. In this case, since there is no need to split a screen for distortion correction, the video of one camera may be displayed as it is.

As described above, in the present exemplary embodiment, first quantity obtainer 43 obtains a first quantity (for example, the number of entering customers) associated with customers who are expected to purchase products in a store, in other words, customers who enter the store, for each of the plurality of stores, second quantity obtainer 44 obtains a second quantity (for example, number of paying customers in the store) associated with customers who actually purchase products in the store, in each of the plurality of stores, video obtainer 38 obtains the captured video of the inside of the store for each of the plurality of stores, statistical information generator 34 generates statistical information indicating temporal change in status of the first quantity and the second quantity for each of the plurality of stores, display output controller 36 outputs display information in which the statistical information regarding the selected store and the video of the inside of the store are integrated and displayed, in response to a user's operation to select any of a plurality of stores, to a display device, and in particular, display output controller 36 displays statistical information along a time axis, displays a selection point on the time axis, and displays the video of the inside of the store at the selected selection point, in response to a user's operation to select the selection point. Thus, since the statistical information regarding each store is displayed, the user can understand the status of the opportunity loss in each store. Since the video of the inside of the store of the selection point that is considered to be a problem based on the statistical information is displayed, the user can specifically check the status of the opportunity loss. Since the statistical information pieces and the videos of respective stores are compared with each other in respective stores, the user can efficiently perform a task of specifying a store for which improvement is desired from a large number of stores. Thus, the user can efficiently perform a task of considering an improvement to reduce the opportunity loss in each store, and it is possible to reduce the burden of the user who performs store management targeting a very large number of stores.

In the present exemplary embodiment, since store evaluator (facility evaluator) 52 evaluates the necessity for attention for each of the plurality of stores, based on a first quantity (for example, the number of entering customers) and a second quantity (for example, number of paying customers in the store), and gives priority to stores in a descending order of the necessity for attention, and display output controller 36 arranges and displays choices of the plurality of stores according to the priority, and outputs the display information regarding the selected store, in response to an operation to select a choice of the store, the statistical information and the video of the store can be displayed by quickly selecting the store having high necessity for attention, and thus the user can efficiently perform a task of checking the status of the opportunity loss.

In the present exemplary embodiment, since store evaluator 52 evaluates the necessity for attention for each of the plurality of stores, based on a difference between the number of customers who enter the store (the number of entering customers) and the number of customers who actually purchase products in the store (number of paying customers in the store), it is possible to appropriately evaluate the necessity for attention of each store.

In the present exemplary embodiment, since processing condition setter (individual area setter) 39 sets an important sales floor (individual area) in a store, first quantity obtainer 43 obtains a first quantity targeting an important sales floors, second quantity obtainer 44 obtains a second quantity targeting the important sales floor, and store evaluator (facility evaluator) 52 evaluates the necessity for attention for each of the plurality of stores, based on the first quantity and the second quantity, it is possible to appropriately evaluate the necessity for attention of each store.

In the present exemplary embodiment, since store evaluator (facility evaluator) 52 evaluates the necessity for attention for each of a plurality of stores, based on a difference between the number of customers who are on an important sales floor (the number of customers staying at a sales floor) and the number of customers who actually purchase products in the important sales floor (the number of paying customers in a sales floor), or a difference between the number of customers who enter the store (the number of entering customers) and the number of customers staying at the important sales floor (the number of customers staying at a sales floor), it is possible to appropriately evaluate the necessity for attention of each store.

In the present exemplary embodiment, first quantity obtainer 43 obtains a first quantity targeting each of a plurality of sales floors (individual areas), second quantity obtainer 44 obtains a second quantity targeting each of the plurality of sales floors, sales floor evaluator (individual area evaluator) 53 evaluates the necessity for attention for each of the plurality of sales floors, based on the first quantity and the second quantity, and determines a sales floor which needs attention, and display output controller 36 highlights the video of the sales floor which needs attention. Thus, since the video of the sales floor can be displayed by quickly selecting the sales floor which needs attention, without viewing the statistical information of the individual area, the user can efficiently perform a task of specifically checking the status of the opportunity loss in each sales floor by using the video.

In the present exemplary embodiment, first quantity obtainer 43 obtains a first quantity targeting each of a plurality of sales floors (individual areas), second quantity obtainer 44 obtains a second quantity targeting each of the plurality of sales floors, sales floor evaluator (individual area evaluator) 53 evaluates the necessity for attention for each of the plurality of sales floors, based on the first quantity and the second quantity, and gives priority to sales floor in a descending order of the necessity for attention, and display output controller 36 arranges and displays videos of sales floors in a descending order of priority. Thus, since the video of the sales floor can be displayed by quickly selecting the sales floor having a high degree of necessity for attention, without viewing the statistical information of the individual area, the user can efficiently perform a task of specifically checking the status of the opportunity loss in each sales floor by using the video.

In the present exemplary embodiment, since sales floor evaluator (individual area evaluator) 53 evaluates the necessity for attention for each of a plurality of sales floors, based on a difference between the number of customers who are on a sales floor (individual area) (the number of customers staying at a sales floor) and the number of customers who actually purchase products in the sales floor (the number of paying customers in a sales floor), or a difference between the number of customers who enter the store (the number of entering customers) and the number of customers who are on a sales floor (the number of customers staying at a sales floor), it is possible to appropriately evaluate the necessity for attention of each sales floor.

Hitherto, the present invention has been described based on specific exemplary embodiments, but the exemplary embodiments are merely illustrative, and the present invention is not limited to the exemplary embodiments. The respective configuration components of the facility management support apparatus, the facility management support system, and the facility management support method according to the present invention illustrated in the above exemplary embodiments are not necessarily all required, and can be appropriately selected without departing from at least the scope of the present invention.

For example, in the present exemplary embodiment, a description has been made for an example of a retail store such as a convenience store, but the present exemplary embodiment can be widely applied to a variety of facilities that provide customers with goods and services such as financial institutions such as banks, or accommodation facilities such as hotels. In such a facility, opportunity loss, in other words, loss (lost profits) caused by loss of opportunity to provide customers with goods or services due to circumstances on the facility side becomes a problem, and the user can understand the status of the opportunity loss by comparing a first quantity associated with customers for whom the supply of goods or services is expected with a second quantity associated with customers who actually receive the supply of goods or services.

For example, it is possible to define the number of people who are supposed to stay and the number of people in a lobby as a first quantity, and the number of people staying at a hotel as a second quantity, in a hotel, and it is possible to define the number of entering customers or the number of people in a waiting area as a first quantity, and the number of reception number tags, in other words, the number of customers using the reception number tags as a second quantity, in a bank. The user can understand the status of the opportunity loss from a difference between the first quantity and the second quantity.

In the present exemplary embodiment, a first quantity, in other words, the number of entering customers and the number of customers staying at a sales floor are obtained based on videos captured by camera 1, but it is possible to obtain the first quantity based on the detection result by sensors such as passage sensors. In the present exemplary embodiment, a second quantity, in other words, the number of paying customers in a store and the number of paying customers in a sales floor are obtained based on the sales information of a POS system, but it is possible to obtain the second quantity based on the videos captured by camera 1.

In the present exemplary embodiment, a difference between the number of entering customers and the number of paying customers in a store is calculated as the store gap, but a proportion of purchasing customers in the entire store (a ratio of the number of paying customers in a store relative to the number of entering customers), in other words, a percentage of customers who have purchased products among the entering customers may be calculated.

In the present exemplary embodiment, a difference between the number of entering customers and the number of customers staying at a sales floor is calculated as the sales floor gap, but a stop-by rate of a sales floor (a ratio of the number of customers staying at a sales floor relative to the number of entering customers), in other words, a percentage of the customers staying at a sales floor in the entering customers may be calculated. In the present exemplary embodiment, a difference between the number of customers staying at a sales floor and the number of paying customers in a sales floor is calculated as the sales floor gap, but a customer's purchase ratio in a sales floor (a ratio of the number of customers staying at a sales floor relative to the number of customers staying at a sales floor), in other words, a percentage of the customers who have purchased products among customers staying at a sales floor may be calculated.

In the present exemplary embodiment, the number of paying customers in a sales floor is used as the indicator indicating the product purchase status in the sales floor, but the number of purchased products for each sales floor is obtained by aggregating the quantity of the purchased products which is included in the sales information obtained from a POS server, for each sales floor, and may be used instead of the number of paying customers in a sales floor.

In the present exemplary embodiment, customer detector 32 that detects people is provided in PC 11, but a person detection device may be provided separately from PC 11. It is also possible to configure a camera with a human detection function by integrating this person detection device into camera 1.

In the present exemplary embodiment, PC 11 provided in the headquarters performs a process required for facility management support, but as illustrated in FIG. 1, the required process may be performed by PC 3 provided in the store, or cloud computer 21 constituting a cloud computing system. The required process may be shared by a plurality of information processing apparatuses, and information may be exchanged between the plurality of information processing apparatuses through a communication medium such as an IP network and a LAN. In this case, a facility management support system is configured with the plurality of information processing apparatuses sharing the required process.

In such a configuration, among processes required for facility management support, at least a process with a large amount of computation, for example, a person detection process may be performed in a device such as PC 3 provided in the store. Thus, since the amount of data of information required in the remaining process is small, even if the remaining process is performed in an information processing apparatus provided in a location different from that of the store such as the headquarters, it is possible to reduce the communication load, such that the operation of a system according to a wide area network topology becomes easy.

Among processes required for facility management support, at least a process with a large amount of computation, for example, a person detection process may be performed in cloud computer 21. Through this configuration, since the remaining process has a small computation amount, a high-speed processing capability is not required in devices on the user side such as the headquarters and stores, and it is possible to reduce the burden of the cost to the user.

Cloud computer 21 performs all of the required processes, or among required processes, at least a display information generation process may be shared by cloud computer 21. Through this configuration, in addition to PC 3 and 11 provided in the store or the headquarters, even a portable terminal such as smartphone 22 or tablet terminal 23 can display information on the facility management support, and this makes it possible to check the information on the facility management support of the customer at any location such as a visiting destination, in addition to the store or headquarters.

In the present exemplary embodiment, PC 11 provided in the headquarters performs a process required for the facility management support, a screen of a GUI is displayed on monitor 15 of PC 11, and necessary input and output are performed in PC 11, but necessary input and output may be performed in an information processing apparatus other than the information processing apparatus that performs a process required for the facility management support, for example, a portable terminal such as tablet terminal 23. In particular, if a person in charge of the facility management operations, such as a supervisor, possesses a portable terminal such as tablet terminal 23, and performs browsing and input operations anywhere, convenience can be further enhanced.

According to the facility management support apparatus, the facility management support system, and the facility management support method according to the present invention, the user can properly and quickly understand the status of the opportunity loss in the facility, and efficiently perform a task of considering an improvement to reduce the opportunity loss, such that there is an effect that it is possible to reduce the burden of the user who performs facility management targeting a very large number of facilities, and the present invention is useful for the facility management support apparatus, the facility management support system, and the facility management support method, which support a task of a user who manages facilities that provide customers with goods or services.

What is claimed is:

1. A facility management support apparatus that supports a user's task of managing a facility which provides a customer with goods or services, the facility management support apparatus comprising a computer that executes a program stored in a memory, the computer configured to:
   set a plurality of individual areas in the facility;
   obtain a first quantity of a number of customers who are on each of the plurality of individual areas in the facility;
   obtain a second quantity of a number of customers who actually receives the supply of goods or services from the facility on each of the plurality of individual areas in the facility;
   obtain a captured video of each of the plurality of individual areas in the facility;

evaluate a necessity for attention, by comparing a threshold with a number obtained by deducting the second quantity from the first quantity for each of the plurality of individual areas;
determine target areas for attention among the plurality of individual areas based on the evaluated necessity for attention for each of the plurality of individual areas; and
display, via a display, a plurality of videos captured at each of the plurality of individual areas and highlight at least one of the plurality of videos which corresponds to the determined target areas for attention.

2. The facility management support apparatus of claim 1, wherein the threshold is larger on holidays or weekends than on weekdays.

3. The facility management support apparatus of claim 1, wherein the threshold is larger at daytime than at night.

4. The facility management support apparatus of claim 1, wherein the threshold varies based on a day of a week.

5. The facility management support apparatus of claim 1, wherein the threshold varies based on a particular day of a year.

6. The facility management support apparatus of claim 1, wherein the threshold varies based on a particular time of a day.

7. A facility management support apparatus that supports a user's task of managing a facility which provides a customer with goods or services, the facility management support apparatus comprising:
a computer that executes a program stored in a memory, such that the computer is configured to:
set a plurality of individual areas in the facility;
obtain a first quantity of a number of customers who are on each of the plurality of individual areas in the facility;
obtain a second quantity of a number of customers who actually receives the supply of goods or services from the facility on each of the plurality of individual areas in the facility;
obtain a captured video of each of the plurality of individual areas in the facility;
evaluate a necessity for attention in each timeslot, by comparing a threshold with a number obtained by deducting the second quantity from the first quantity for each of the plurality of individual areas;
assign priority to areas of the facility in a descending order of the necessity for attention; and
display, via a display, a plurality of videos captured at each of the plurality of individual areas in order of the assigned priority.

8. A facility management support method for performing a process of supporting a user's task of managing a facility which provides a customer with goods or services by using an information processing apparatus, the method comprising:
setting, by a computer, a plurality of individual areas in the facility;
obtaining, by the computer, a first quantity of a number of customers who are on each of the plurality of individual areas in the facility;
obtaining, by the computer, a second quantity of a number of customers who actually receives the supply of goods or services from the facility on each of the plurality of individual areas in the facility;
obtaining, by the computer, a captured video of each of the plurality of individual areas in the facility;
evaluating, by the computer, a necessity for attention, by comparing a threshold with a number obtained by deducting the second quantity from the first quantity for each of the plurality of individual areas;
determining, by the computer, target areas for attention among the plurality of individual areas based on the evaluated necessity for attention for each of the plurality of individual areas; and
displaying, via a display connected to the computer, a plurality of videos captured at each of the plurality of individual areas and highlight at least one of the plurality of videos which corresponds to the determined individual areas for attention.

9. A facility management support method for performing a process of supporting a user's task of managing a facility which provides a customer with goods or services by using an information processing apparatus, the method comprising:
setting, by a computer, a plurality of individual areas in the facility;
obtaining, by the computer, a first quantity of a number of customers who are on each of the plurality of individual areas in the facility;
obtaining, by the computer, a second quantity of a number of customers who actually receives the supply of goods or services from the facility on each of the plurality of individual areas in the facility;
obtaining, by the computer, a captured video of each of the plurality of individual areas in the facility;
evaluating, by the computer, a necessity for attention in each timeslot, by comparing a threshold with a number obtained by deducting the second quantity from the first quantity for each of the plurality of individual areas;
assigning, by the computer, priority to areas of the facility in a descending order of the necessity for attention; and
displaying, via a display connected to the computer, a plurality of videos captured at each of the plurality of individual areas in order of the assigned priority.

* * * * *